US011343449B2

(12) United States Patent
Paik et al.

(10) Patent No.: US 11,343,449 B2
(45) Date of Patent: May 24, 2022

(54) IMAGE SENSOR FOR IMPLEMENTING HIGH DYNAMIC RANGE IMAGE USING DUAL CONVERSION GAIN

(71) Applicant: Samsung Electronics Co., Ltd., Suwon-si (KR)

(72) Inventors: Daehwa Paik, Seoul (KR); Seung Hyun Lim, Hwaseong-si (KR); Jaehong Kim, Suwon-si (KR); Keunyung Byun, Suwon-si (KR); Jinwoo Kim, Seoul (KR); Sanghyun Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/157,086

(22) Filed: Jan. 25, 2021

(65) Prior Publication Data
US 2021/0250530 A1    Aug. 12, 2021

(30) Foreign Application Priority Data

Feb. 10, 2020 (KR) .......................... 10-2020-0015727

(51) Int. Cl.
*H04N 5/355*    (2011.01)
*H04N 5/3745*   (2011.01)
*H04N 5/378*    (2011.01)

(52) U.S. Cl.
CPC .......... *H04N 5/3559* (2013.01); *H04N 5/378* (2013.01); *H04N 5/37455* (2013.01)

(58) Field of Classification Search
CPC .. H04N 5/3559; H04N 5/37455; H04N 5/378; H04N 5/37457; H04N 5/355; H04N 5/343
See application file for complete search history.

(56) References Cited

U.S. PATENT DOCUMENTS

| | | | |
|---|---|---|---|
| 7,554,066 B2 * | 6/2009 | Yan | H04N 5/3658 250/208.1 |
| 9,894,304 B1 | 2/2018 | Smith et al. | |
| 10,044,960 B2 | 8/2018 | Mao et al. | |
| 10,070,081 B2 | 9/2018 | Mo et al. | |
| 10,171,760 B2 * | 1/2019 | Otaka | H04N 5/3559 |
| 10,257,448 B1 | 4/2019 | Tower et al. | |
| 10,510,796 B1 * | 12/2019 | Wang | H01L 27/14634 |
| 2012/0062772 A1 * | 3/2012 | Osawa | H04N 5/378 348/300 |

(Continued)

*Primary Examiner* — Nhan T Tran
(74) *Attorney, Agent, or Firm* — Harness, Dickey & Pierce, P.L.C.

(57) ABSTRACT

Disclosed is an image sensor that includes a pixel array including first pixels sharing a first floating diffusion region and second pixels sharing a second floating diffusion region, a first analog-to-digital converter, a second analog-to-digital converter, and a switch circuit. In a first mode, the first analog-to-digital converter processes the first pixels, and the second analog-to-digital converter processes the second pixels. In the second mode, the first analog-to-digital converter processes a first image component of a pixel signal of the first pixels, and the second analog-to-digital converter processes a second image component of the pixel signal of the first pixels. An HDR image is implemented based on processing results of the first analog-to-digital converter and the second analog-to-digital converter.

20 Claims, 21 Drawing Sheets

(56) References Cited

U.S. PATENT DOCUMENTS

| | | | |
|---|---|---|---|
| 2015/0350583 A1* | 12/2015 | Mauritzson | H04N 5/374 |
| | | | 250/208.1 |
| 2017/0208273 A1 | 7/2017 | Mandelli et al. | |
| 2018/0278869 A1 | 9/2018 | Fan | |
| 2018/0302578 A1* | 10/2018 | Ebihara | H01L 27/1255 |
| 2019/0104273 A1* | 4/2019 | Sato | H04N 5/37455 |
| 2019/0222780 A1* | 7/2019 | Chang | H04N 5/3559 |
| 2019/0238774 A1* | 8/2019 | Kono | H04N 5/36961 |
| 2020/0059240 A1* | 2/2020 | Moue | H03M 3/368 |
| 2021/0211591 A1* | 7/2021 | Kainuma | H04N 5/3454 |

\* cited by examiner

IMAGE SENSOR FOR IMPLEMENTING HIGH DYNAMIC RANGE IMAGE USING DUAL CONVERSION GAIN

CROSS-REFERENCE TO RELATED APPLICATIONS

This application claims priority under 35 U.S.C. § 119 to Korean Patent Application No. 10-2020-0015727 filed on Feb. 10, 2020, in the Korean Intellectual Property Office, the disclosure of which is incorporated by reference herein in its entireties.

BACKGROUND

Some example embodiments relate to an image sensor, and more particularly, relate to an image sensor for implementing a high-dynamic range (HDR) image by using a dual conversion gain.

An image sensor includes at least one of a charge coupled device (CCD) image sensor, a complementary metal-oxide semiconductor (CMOS) image sensor (CIS), etc. The CMOS image sensor includes pixels formed of/comprising CMOS transistors and converting light energy into an electrical signal by using a photoelectric conversion element included within each pixel. The CMOS image sensor obtains information about a captured/photographed image by using the electrical signal generated at each pixel.

Meanwhile, with the increasing demand of the CMOS image sensor included in a smart phone and/or the increasing demand on a high-quality image, various techniques for HDR implementation are being developed. For example, there is an HDR implementation technique for combining images photographed with different exposure times. However, such techniques cause distortion of an image, such as motion artifact.

SUMMARY

Some example embodiments provide an image sensor for implementing an HDR image by using a dual conversion gain and an operating method thereof.

According to some example embodiments, an image sensor includes a pixel array including first pixels sharing a first floating diffusion region and second pixels sharing a second floating diffusion region, a first analog-to-digital converter configured to process a first pixel signal in a first mode, the first pixel signal output from at least one pixel from among the first pixels through a first column line, a second analog-to-digital converter configured to process a second pixel signal in the first mode, the second signal output from at least one pixel from among the second pixels through a second column line, and a switch circuit configured to selectively connect the first column line with the second analog-to-digital converter in a second mode, the switch circuit selectively connecting the first column line with the second analog-to-digital converter such that the second analog-to-digital converter processes the first pixel signal. In the second mode, the first analog-to-digital converter is configured to compare a first image component of the first pixel signal with a ramp signal, and to output a first digital value corresponding to the first image component. In the second mode, the second analog-to-digital converter is configured to compare the ramp signal with a second image component of the first pixel signal, and to output a second digital value corresponding to the second image component.

BRIEF DESCRIPTION OF THE FIGURES

The above and other objects and features of some example embodiments will become apparent by describing in detail exemplary embodiments thereof with reference to the accompanying drawings.

DETAILED DESCRIPTION OF EXAMPLE EMBODIMENTS

Below, some example embodiments may be described in detail and clearly to such an extent that an ordinary one in the art easily implements example embodiments.

Components that are described in the detailed description with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
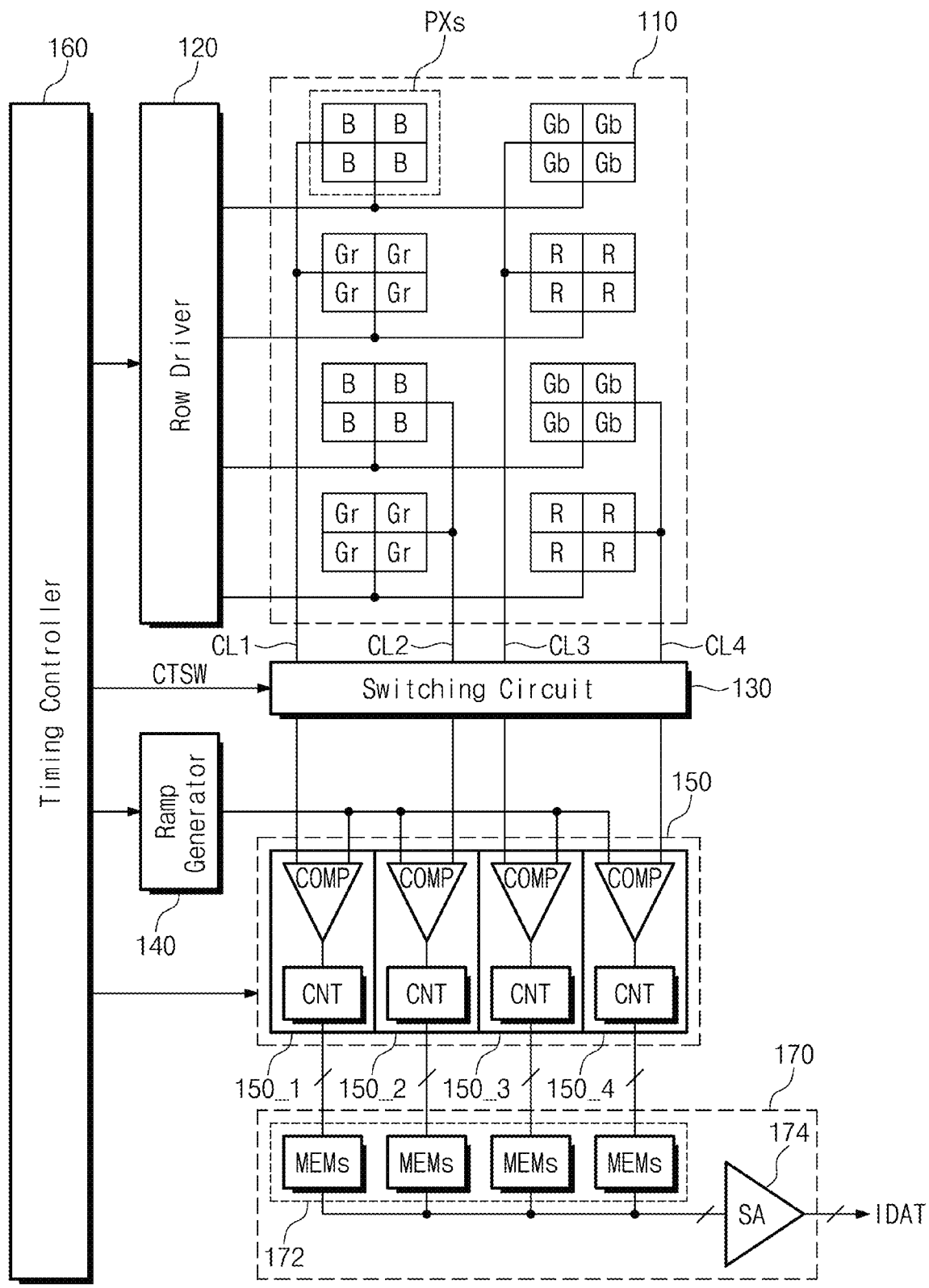
FIG. 1 illustrates a configuration of an image sensor according to some example embodiments.

FIG. 1 illustrates a configuration of an image sensor according to some example embodiments.

An image sensor 100 may include a pixel array 110, a row driver 120, a switching circuit 130, a ramp signal generator 140, an analog-to-digital converting block (hereinafter referred to as an "ADC block") 150, a timing controller 160, and a buffer 170.

The pixel array 110 may include a plurality of pixels arranged along rows and columns, and may be arranged in the form of a matrix. Each of the plurality of pixels may include a photoelectric conversion element. For example, the photoelectric conversion element may include at least one of a photo diode, a phototransistor, a photo gate, or a pinned photo diode. Each of the plurality of pixels may sense a light by using the photoelectric conversion element and may convert the sensed light into an electrical signal (hereinafter referred to as a "pixel signal").

The pixel array 110 may include a plurality of pixel groups. Each pixel group PXs may include at least two or more pixels. An example is illustrated in FIG. 1 as the pixel group PXs includes pixels arranged in two rows and two columns. The pixels constituting/include in the pixel group PXs may share one floating diffusion region. However, example embodiments are not limited thereto. For example, the pixels constituting/include in the pixel group PXs may share a plurality of floating diffusion regions. Alternatively or additionally, an example is illustrated in FIG. 1 as the pixel array 110 includes pixel groups PXs arranged in four rows and two columns (e.g., 4×2 pixel groups PXs). However, example embodiments are not limited thereto.

The pixel group PXs may include pixels of/having the same color. For example, the pixel group PXs may include red pixels "R" to convert a light of a red spectrum into an electrical signal, green pixels Gr/Gb to convert a light of a green spectrum into an electrical signal, or blue pixels "B" to convert a light of a blue spectrum into an electrical signal. For example, the pixels constituting/include in the pixel array 110 may be arranged in the form of a Bayer pattern. There may be filters (not shown) above the pixel groups PXs corresponding to the respective colors of the associated pixel groups PXs.

Pixel groups arranged along one column may be alternately connected with two column lines. For example, some of pixel groups disposed at a first column may be connected with a first column line CL1, and the others thereof may be connected with a second column line CL2. As in the above description, some of pixel groups disposed at a second column may be connected with a third column line CL3, and the others thereof may be connected with a fourth column line CL4.

The row driver 120 may select and/or drive a row of the pixel array 110, e.g. may apply voltages to gates of transistors included in the pixel groups PXs. The row driver 120 may decode an address and/or a control signal generated by the timing controller 160 and may generate control signals for selecting and driving a row of the pixel array 110. For example, the control signals may include a signal for selecting a pixel, a signal for resetting a floating diffusion region, a signal for selecting a column line, etc.

The switching circuit 130 may control a path through which an analog signal e.g., a pixel signal) output from the pixel array 110 is transferred to the ADC block 150. In a first mode (e.g., a normal mode), the switching circuit 130 may set the path such that one pixel group PXs is connected with one analog-to-digital converter (hereinafter referred to as an "ADC"). In a second mode (e.g., an HDR mode), the switching circuit 130 may set the path such that one pixel group PXs is connected with two ADCs. For example, the switching circuit 130 may include a plurality of switches that operate in response to a switch control signal CTSW generated by the timing controller 160.

The ramp signal generator 140 may generate a ramp signal. The ramp signal generator 140 may operate under control of the timing controller 160. For example, the ramp signal generator 140 may operate in response to a control signal, such as a ramp enable signal and/or a mode signal. When the ramp enable signal is activated, the ramp signal generator 140 may generate the ramp signal having a given slope based on the mode signal.

The ADC block 150 may convert an analog signal (e.g., a pixel signal) output from the pixel array 110 to a digital signal. The ADC block 150 may include, for example, four ADCs 150_1, 150_2, 150_3, and 150_4, each of, or at least one of, which includes a comparator COMP and a counter CNT. The comparator COMP may compare a pixel signal output through a column line (e.g., one of CL1 to CL4) connected with the comparator COMP with a ramp signal RAMP and may output a comparison result. For example, the comparator COMP may operate based on a double sampling technique.

For example, pixel signals output from a plurality of pixels may have a deviation/variability, for example due to a certain characteristic/unique characteristic (e.g., a fixed pattern noise) of a pixel and/or a deviation due to a characteristic difference of logic for outputting a pixel signal. To compensate for/reduce the impact of a deviation between pixel signals, an operation of obtaining a reset signal and an image signal with respect to each pixel signal and of extracting a difference between the reset signal and the image signal as an effective signal component is called "correlated double sampling".

The counter CNT may count pulses of an output signal of the corresponding comparator COMP. The counter CNT may operate under control of the timing controller 160. For example, the counter CNT may operate in response to control signals, such as a counter clock signal, a counter reset signal for controlling a reset of the counter CNT, and/or an inversion signal for inverting an internal bit of the counter CNT. The counter CNT may count a comparison result signal depending on the counter clock signal and may output a counting result as a digital signal.

The counter CNT may include at least one of an up/down counter, a bit-wise inversion counter, etc. An operation of the bit-wise counter may be similar to an operation of the up/down counter. For example, the bit-wise counter may perform at least one of the following functions: a function to perform only up-counting and a function to convert all internal bits of the counter in response to a specific signal for the purpose of obtaining the 1's complement. The bit-wise counter may perform a reset count and/or may invert a result of the reset count into the 1's complement, that is, a negative value.

In some example embodiments, in the first mode, one ADC may process pixel signals received from one pixel group PXs. In the second mode, one ADC may perform processing associated with the low conversion gain signal among the pixel signals received from one pixel group PXs, and the other ADC may perform processing associated with a high conversion gain signal among the pixel signals received from the pixel group PXs. As a result, a dynamic range of image data IDAT may be improved. Details of the operations of the ADCs will be more fully described below.

The timing controller 160 may generate a control signal and/or a clock for controlling an operation and/or a timing of each of the row driver 120, the switching circuit 130, the ADC block 150, the ramp signal generator 140, and the counter CNT.

The buffer 170 may include a set of memories MEMs and a sense amplifier SA. The memories MEMs may store a digital signal output from the corresponding ADC. The sense amplifier SA may sense and amplify the stored digital signal.

The sense amplifier SA may output the amplified digital signal as the image data IDAT.

Figure 2:
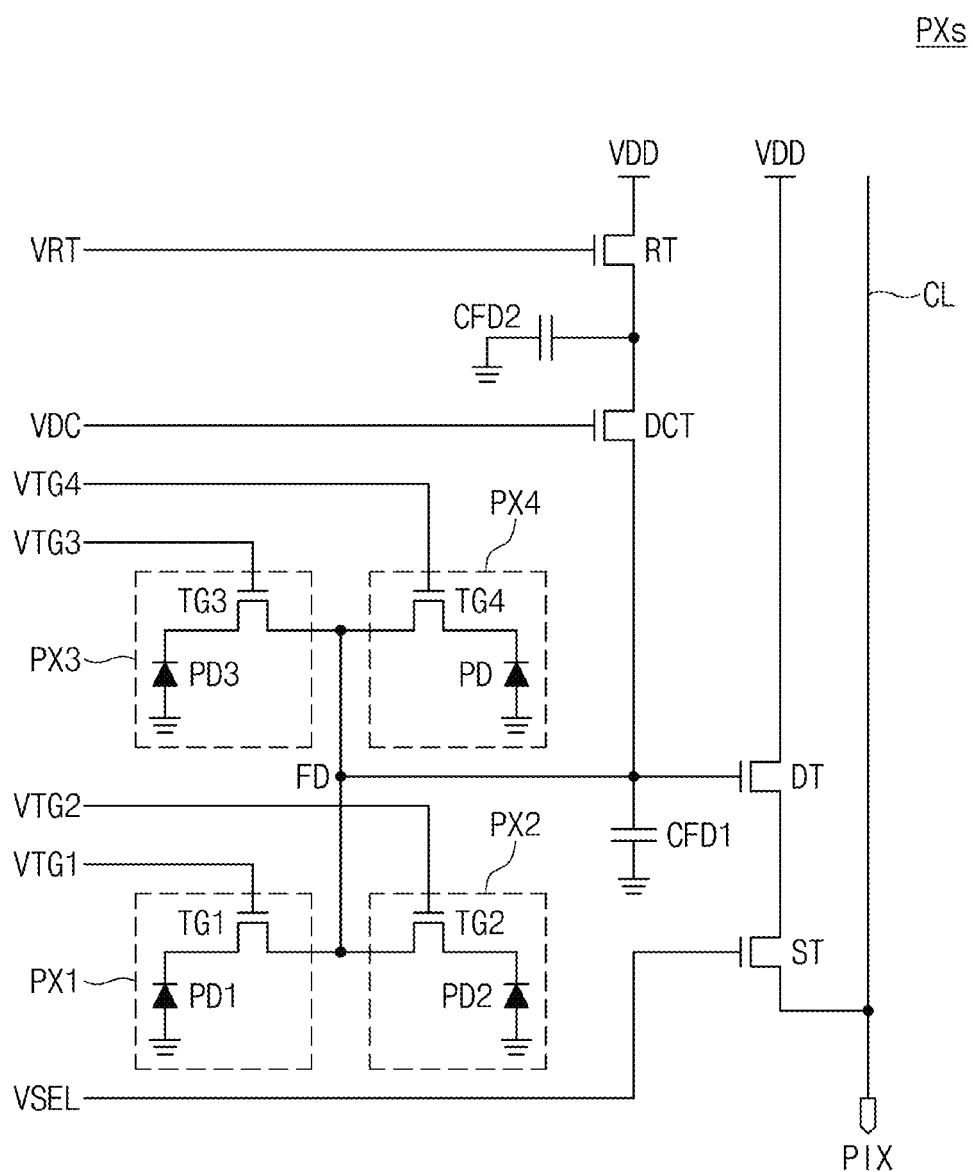
FIG. 2 is a circuit diagram illustrating an example configuration of a pixel group of FIG. 1.
Figure 3A:
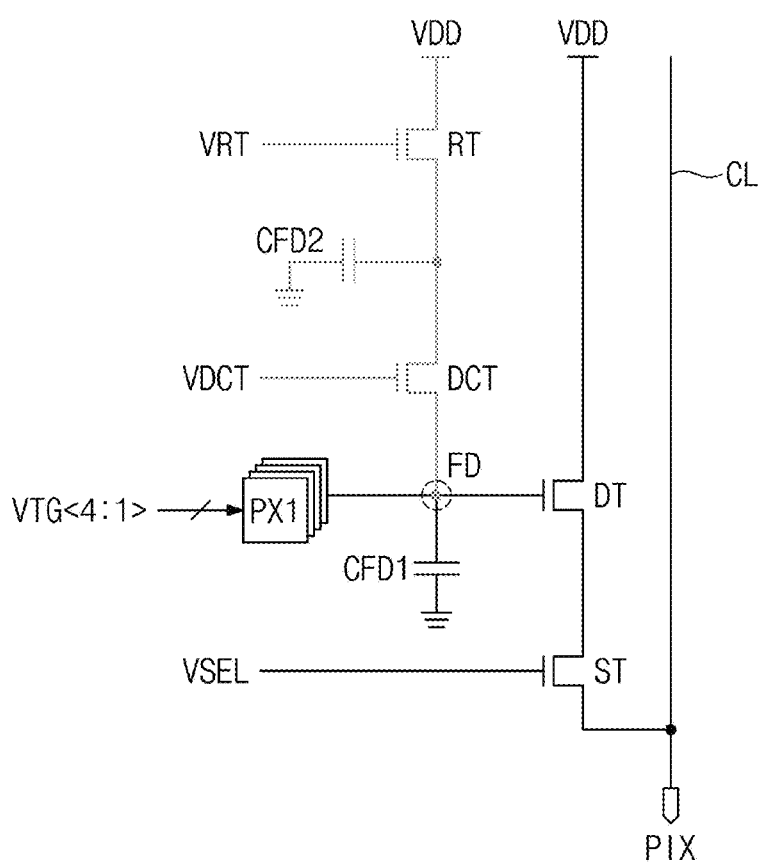
FIG. 3A is a circuit diagram illustrating a floating diffusion region when a dual conversion transistor is turned off, according to some example embodiments.
Figure 3B:
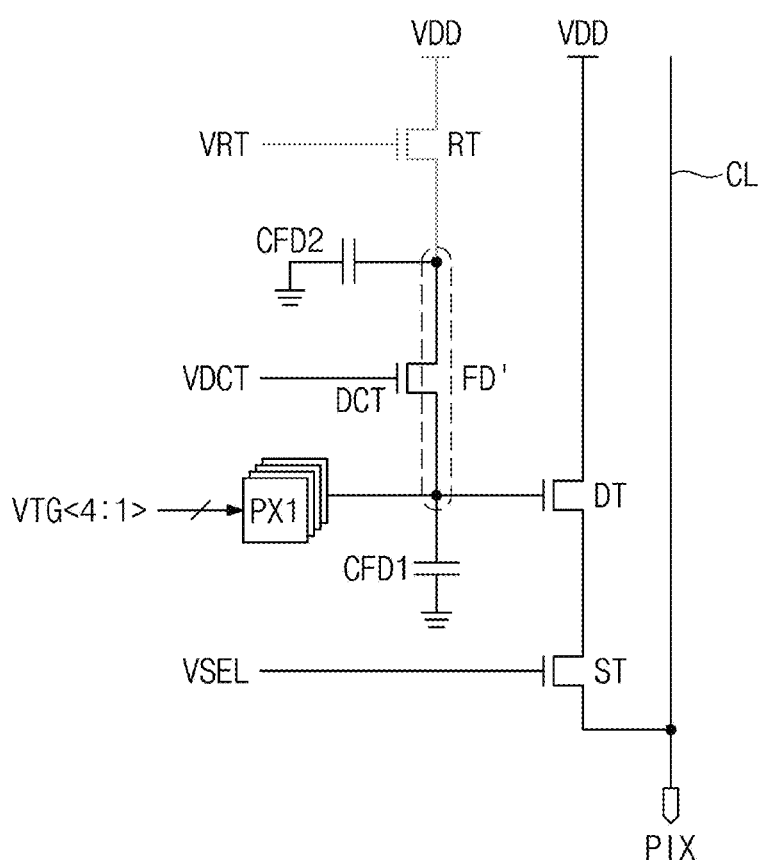
FIG. 3B is a circuit diagram illustrating an expanded floating diffusion region when a dual conversion transistor is turned on, according to some example embodiments.

FIG. 2 is a circuit diagram illustrating an example configuration of the pixel group PXs of FIG. 1. FIG. 3A is a circuit diagram illustrating a floating diffusion region FD when a dual conversion transistor DCT is turned off. FIG. 3B is a circuit diagram illustrating an expanded floating diffusion region FD' when the dual conversion transistor DCT is turned on.

Initially, referring to FIG. 2, the pixel group PXs may include photoelectric conversion elements PD1 to PD4, transfer transistors TG1 to TG4, a dual conversion transistor DCT, a reset transistor RT, a drive transistor DT, and a select transistor ST. A first pixel PX1 may include the first photoelectric conversion element PD1 and the first transfer transistor TG1. A second pixel PX2 may include the second photoelectric conversion element PD2 and the second transfer transistor TG2, and each of the remaining pixels PX3 and PX4 may include similar components/elements. The first to fourth pixels PX1 to PX4 may share the dual conversion transistor DCT, the reset transistor RT, the drive transistor DT, and the floating diffusion region FD. As described below, each of the transfer transistors TG1-TG4, the dual conversion transistor DCT, the reset transistor RT, the drive transistor DT, and the select transistor ST are described as NMOS transistors; however, example embodiments are not limited thereto.

When the dual conversion transistor DCT is turned off, the floating diffusion region FD may be connected with a first floating diffusion capacitor CFD1. When the dual conversion transistor DCT is turned on, the floating diffusion region FD may be connected with a second floating diffusion capacitor CFD2 as well as the first floating diffusion capacitor CFD1. Below, the floating diffusion region FD may be called a floating diffusion region when the dual conversion transistor DCT is turned off (refer to FIG. 3A), and an expanded floating diffusion region FD' may also be called a floating diffusion region when the dual conversion transistor DCT is turned on (refer to FIG. 3B). For example, the floating diffusion capacitors CFD1 and CFD2 may be a parasitic capacitor and/or a capacitor element.

The transfer transistors TG1 to TG4 may transfer charges to the floating diffusion region FD or the expanded floating diffusion region FD'. The charges may be generated (or integrated) by the photoelectric conversion elements PD1 to PD4. For example, first ends of the transfer transistors TG1, TG2, TG3, and TG4 may be respectively connected with the photoelectric conversion elements PD1, PD2, PD3, and PD4, and second ends thereof may be connected in common with the floating diffusion region FD. The transfer transistors TG1, TG2, TG3, and TG4 may be respectively controlled by transfer signals VTG1, VTG2, VTG3, and VTG4 received from the row driver 120 (refer to FIG. 1).

The floating diffusion region FD and/or the expanded floating diffusion region FD' may integrate charges corresponding to the amount of incident light. The floating diffusion region FD may have a capacitance corresponding to the first floating diffusion capacitor CFD1. During a time when the transfer transistors TG1, TG2, TG3, and TG4 are respectively turned on by the transfer signals VTG1, VTG2, VTG3, and VTG4, charges provided from the photoelectric conversion elements PD1, PD2, PD3, and PD4 may be integrated at the floating diffusion region FD, or the expanded floating diffusion region FD'. The floating diffusion region FD may be connected with a gate terminal of the drive transistor DT that operates as a source follower amplifier. As a result, a voltage potential may be formed; the voltage potential may correspond to charges integrated at the floating diffusion region FD.

Alternatively, in a case where the intensity of light is strong, the capacitance of the floating diffusion region FD may not be sufficient to contain charges generated by the photoelectric conversion elements PD1 to PD4. In this case, because the floating diffusion region FD is easily saturated, information of an image to be photographed may not be appropriately generated. Accordingly, the second floating diffusion capacitor CFD2 may be used to prevent/reduce the likelihood of the above saturation. The second floating diffusion capacitor CFD2 may be provided between the reset transistor RT and the dual conversion transistor DCT. When the dual conversion transistor DCT is turned on by a dual conversion signal VDC, a capacitance of the pixel group PXs may increase to a sum of a capacitance of the first floating diffusion capacitor CFD1 and a capacitance of the second floating diffusion capacitor CFD2.

According to some example embodiments, a dynamic range of the image may be extended by changing a conversion gain by using the dual conversion transistor DCT and the second floating diffusion capacitor CFD2, in a state where exposure times of pixels constituting the pixel group PXs are identically maintained. In addition, a motion artifact that commonly occurs when exposure times of the pixels are different may be prevented or reduced in impact.

The reset transistor RT may be turned on by a reset signal VRST and may provide a reset voltage (e.g., a power supply voltage VDD) to the floating diffusion region FD/and or the expanded floating diffusion region FD'. As a result, charges integrated at the floating diffusion region FD or the expanded floating diffusion region FD' may move to a terminal associated with the power supply voltage VDD, and a voltage of the floating diffusion region FD and/or the expanded floating diffusion region FD' may be reset.

The drive transistor DT may amplify a change of an electrical potential of the floating diffusion region FD and/or the expanded floating diffusion region FD' and may generate a voltage (e.g., a pixel signal PIX) corresponding to an amplification result. The select transistor ST may be driven by a selection signal VSEL, and may select a pixel to be read in units of a row. As the select transistor ST is turned on, the pixel signal PIX may be output through a column line CL.

Meanwhile, the first to fourth pixels PX1 to PX4 may sequentially operate in compliance with a given addressing rule. For example, an operation may be made in the order of the first pixel PX1, the second pixel PX2, the third pixel PX3, and the fourth pixel PX4. Alternatively, an operation may be made in the order of the first pixel PX1, the third pixel PX3, the second pixel PX2, and the fourth pixel PX4, but the addressing rules are not limited thereto.

In addition, the number of pixels included in one pixel group PXs, the number of floating diffusion regions, a color filter layout, etc. are not limited to the above examples. For example, in other embodiments, the pixel group PXs may include nine pixels and three floating diffusion regions; in this case, three pixels may share one floating diffusion region.

Figure 4:
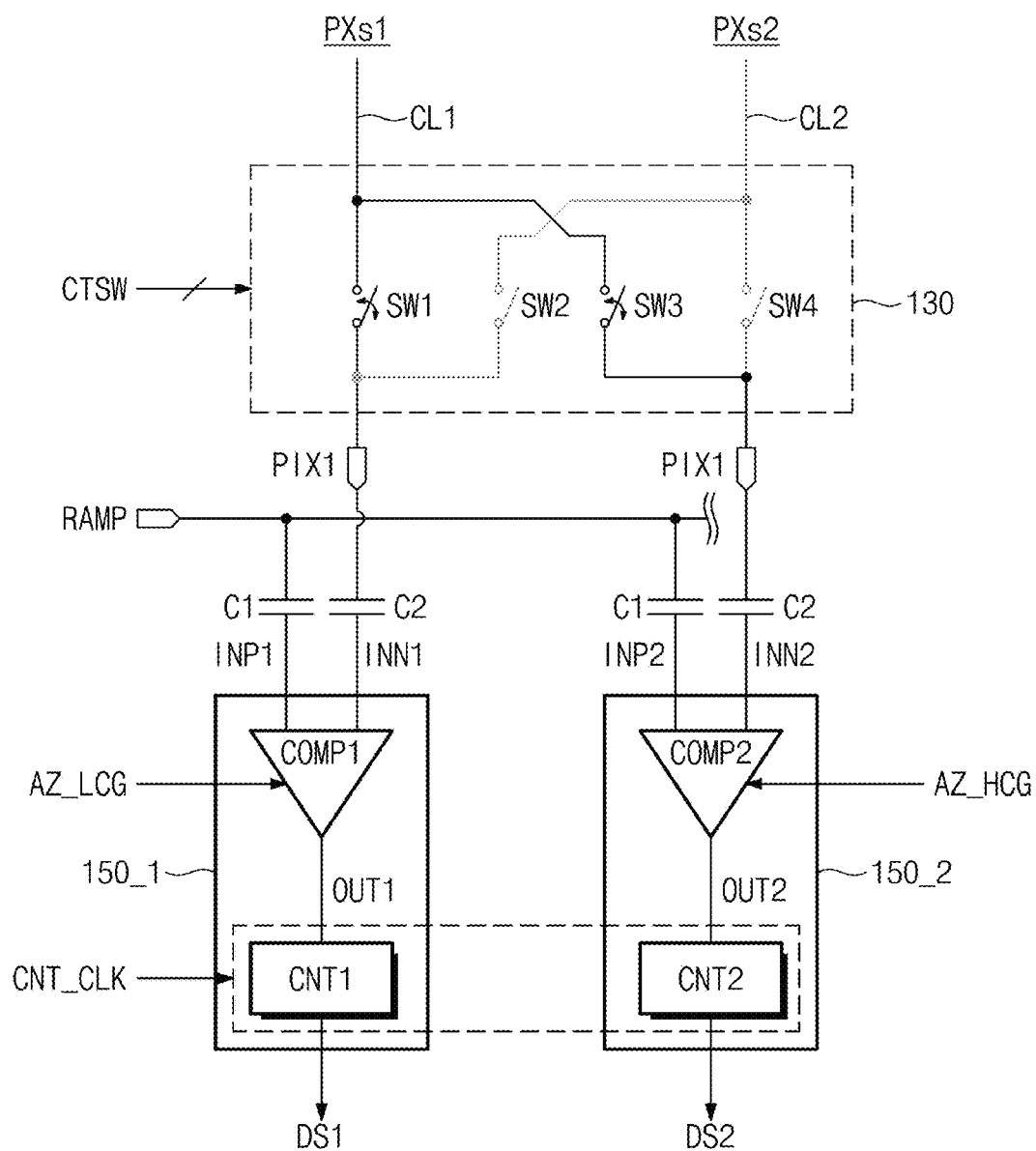
FIG. 4 illustrates an example configuration of a switching circuit and ADCs of FIG. 1.

FIG. 4 illustrates an example configuration of a switching circuit and ADCs of FIG. 1. FIGS. 5A to 5D are timing diagrams associated with operations of ADCs of FIG. 4. An operation of an ADC of some example embodiments will be described with reference to FIGS. 2, 4, and 5A to 5D together.

The switching circuit 130 may control a path through which a pixel signal output from the pixel group PXs is transferred to the ADC block 150. In some example embodiments, the switching circuit 130 may include switches SW1, SW2, SW3, and SW4. Although switches SW1, SW2, SW3, and SW4 are illustrated as NMOS transistors, example embodiments are not limited thereto.

In the first mode, the switches SW1, SW2, SW3, and SW4 may be controlled by the switch control signal CTSW such that two pixel groups PXs1 and PXs2 respectively connected with the different column lines CL1 and CL2 are respectively connected with the ADCs 150_1 and 150_2. For example, in the first mode, the switches SW1 and SW4 may be turned on, and the switches SW2 and SW3 may be turned off. For example, the first mode may be/correspond to a normal mode.

In the second mode, to implement a high dynamic range (HDR) image, the ADC 150_1 may perform processing associated with a low conversion gain of a pixel signal PIX1, and the ADC 150_2 may perform processing associated with a high conversion gain of the pixel signal PIX1. To this end, in the second mode, the switches SW1 and SW3 may be selectively turned on, and the switches SW2 and SW4 may be turned off. For example, while the ADC 150_1 performs processing associated with the low conversion gain, the switch SW1 may be turned on, and the switch SW3 may be turned off. While the ADC 150_2 performs processing associated with the high conversion gain, the switch SW1 may be turned off, and the switch SW3 may be turned on.

Meanwhile, the above configuration of the switching circuit 130 is an example, and example embodiments are not limited thereto. For example, there may be adopted switches that are configured such that each of the ADCs 150_1 to 150_2 performs processing associated with a dual conversion gain of the pixel signal PIX1.

The first ADC 150_1 includes capacitors C1 and C2, a first comparator COMP1, and a first counter CNT1. The second ADC 150_2 includes capacitors C1 and C2, a second comparator COMP2, and a second counter CNT2. However, the capacitors C1 and C2 connected with the first comparator COMP1 may be different from the capacitors C1 and C2 connected with the second comparator COMP2. For example, the capacitors C1 and C2 connected with the first comparator COMP1 may be regarded as not being components of the first comparator COMP1, and the capacitors C1 and C2 connected with the second comparator COMP2 may be regarded as not being components of the second comparator COMP2.

The first comparator COMP1 may receive the ramp signal RAMP through the first capacitor C1 as a first input INP1 and may receive the first pixel signal PIX1 through the second capacitor C2 as a second input INN1. Here, the first pixel signal PIX1 may be a signal output from the first pixel PX1. The first comparator COMP1 may compare a component corresponding to the low conversion gain of the ramp signal RAMP corresponding to the low conversion gain with a component of the first pixel signal PIX1, and may output a comparison result OUT1.

The second comparator COMP2 may receive the ramp signal RAMP through the first capacitor C1 as a first input INP2 and may receive the first pixel signal PIX1 through the second capacitor C2 as a second input INN2. The second comparator COMP2 may compare a component corresponding to the high conversion gain of the ramp signal RAMP with a component corresponding to the high conversion gain of the first pixel signal PIX1 and may output a comparison result OUT2.

An output OUT1 of the first comparator COMP1 may be provided to the first counter CNT1. In an auto-zero period before a comparison operation is performed, the first comparator COMP1 may be initialized in response to an auto-zero signal AZ_LCG (e.g., offset cancellation). An output OUT2 of the second comparator COMP2 may be provided to the second counter CNT2. In the auto-zero period before a comparison operation is performed, the second comparator COMP2 may be initialized in response to an auto-zero signal AZ_HCG.

The first counter CNT1 may count the comparison result OUT1 received from the first comparator COMP1 based on a counting clock signal CNT_CLK, and may generate a digital signal DS1. The second counter CNT2 may count the comparison result OUT2 received from the second comparator COMP2 based on the counting clock signal CNT_CLK, and may generate a digital signal DS2. The digital signal DS1 may have a digital value corresponding to an image component that is obtained by canceling a reset component from the first pixel signal PIX1, and may correspond to the low conversion gain signal. The digital signal DS2 may have a digital value corresponding to the image component that is obtained by canceling the reset component from the first pixel signal PIX, and may correspond to the high conversion gain signal.

Figure 5A:
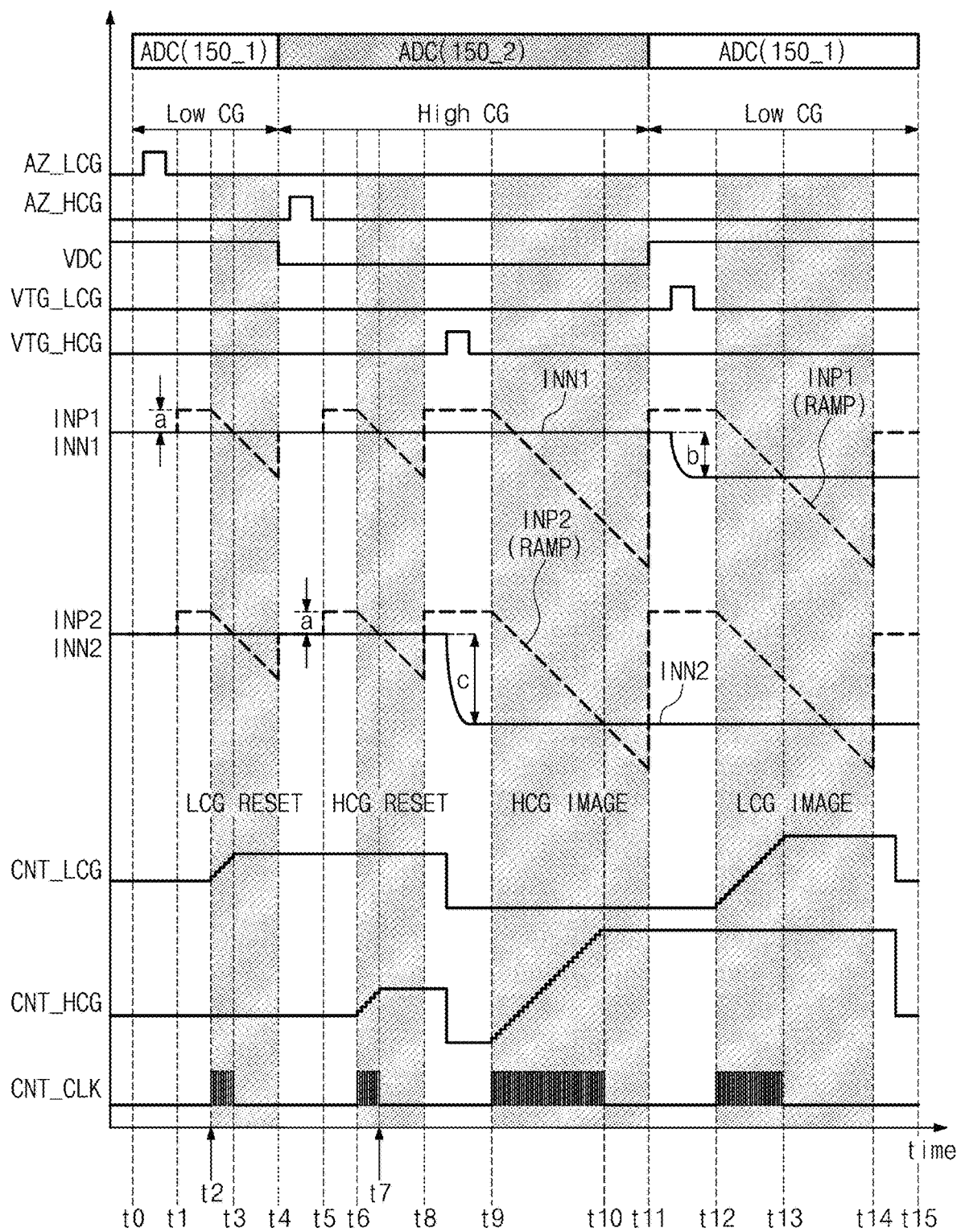
FIGS. 5A to 5D are timing diagrams associated with operations of ADCs of FIG. 4.

Referring to FIG. 4 and the timing diagram of FIG. 5A, a period from t0 to t4 is defined as a reset period of the first ADC 150_1 associated with the low conversion gain. In the period from t0 to t4, the dual conversion signal VDC may be activated. As a result, the floating diffusion region FD may be expanded to the expanded floating diffusion region FD', and ADC initialization e.g., offset cancellation) may be performed under the low conversion gain condition corresponding to the expanded floating diffusion region FD'. In the period from t0 to t4, the switch SW1 may be turned on, and the switches SW2, SW3, and SW4 may be turned off.

In a portion of a period from t0 to t1, the auto-zero signal AZ_LCG may be activated, and the first comparator COMP1 may be initialized in response to the auto-zero signal AZ_LCG. For example, voltage levels of input terminals and/or output terminals of the first comparator COMP1 may be equalized.

At time t1, to convert a reset component of the pixel signal PIX1 input to the first ADC 150_1 into a digital signal, an offset "a" may be applied to the ramp signal RAMP, and a level of the ramp signal RAMP may decrease from time t2. The level of the ramp signal RAMP may decrease at a constant slope; however, example embodiments are not limited thereto, and the level of the ramp signal RAMP may decrease non-linearly. The first counter CNT1 may count the counting clock signal CNT_CLK from time t2 to time t3 at which a polarity of the output OUT1 of the first comparator COMP1 changes. As a counting result, a count value CNT_LCG may increase in a period from t2 to t3.

A period from t4 to t8 may be defined as a reset period of the second ADC 150_2 associated with the high conversion gain. First, the dual conversion signal VDC may be deactivated in a period from t4 to tn. Accordingly, the dual conversion transistor DCT may be turned off, and the first floating diffusion capacitor CFD1 and the second floating diffusion capacitor CFD2 may be electrically disconnected. As a result, the ADC initialization may be performed under the high conversion gain condition corresponding to the floating diffusion region FD. In the period from t4 to t11, the switch SW3 may be turned on, and the switches SW1, SW2, and SW4 may be turned off.

In a portion of a period from t4 to t5, the auto-zero signal AZ_HCG may be activated, and the second comparator COMP2 may be initialized in response to the auto-zero signal AZ_HCG. For example, voltage levels of input terminals and/or output terminals of the second comparator COMP2 may be equalized.

At time t5, to convert a reset component of the pixel signal PIX1 input to the second ADC 150_2 into a digital signal, the offset "a" may be applied to the ramp signal RAMP, and a level of the ramp signal RAMP may decrease from time t6. The second counter CNT2 may count the counting clock signal CNT_CLK from time t6 to time t7 at which a polarity of the output OUT2 of the second comparator COMP2 changes. As a counting result, a count value CNT_HCG may increase in a period from t6 to t7.

At time t8 or at any time point between t8 and t9, a bit of the count value CNT_LCG counted by the first counter CNT1 and a bit of the count value CNT_HCG counted by the second counter CNT2 may be inverted, e.g. in response to an inversion signal generated by the timing controller 160 (refer to FIG. 1).

A period from t8 to t11 may be defined as a comparison operation period of the second ADC 150_2 associated with the high conversion gain. A comparison operation of the second ADC 150_2 may be associated with comparing the ramp signal RAMP and the pixel signal PIX1 for the purpose of converting an image signal corresponding to the high conversion gain of the pixel signal PIX1 into a digital value.

At time t8, an offset may be applied to the ramp signal RAMP. At any time point between t8 and t9, a transfer control signal VTG_HCG may be activated, and a voltage level of the second input INN2 may be decreased, e.g. by charges integrated at the floating diffusion region FD as marked by "c". Here, the transfer control signal VTG_HCG may correspond to one of the transfer control signals VTG1 to VTG4 of FIG. 2. For example, the decrease in the voltage level of the second input INN2 marked by "c" in the period from t8 to t9 may come from/be associated with charges stored in the first floating diffusion capacitor CFD1 connected with the floating diffusion region FD.

At time t9, a level of the ramp signal RAMP may decrease, e.g. may decrease linearly or non-linearly. The second counter CNT2 may count the counting clock signal CNT_CLK from time t9 to time t10 at which a polarity of the output OUT2 of the second comparator COMP2 changes. Accordingly, the digital value CNT_HCG of an image signal corresponding to the high conversion gain may be counted in a period from t9 to t10.

A period from t11 to t14 may be defined as a comparison operation period of the first ADC 150_1 associated with the low conversion gain. A comparison operation of the first ADC 150_1 may be associated with comparing the ramp signal RAMP and the pixel signal PIX1 for the purpose of converting an image signal corresponding to the low conversion gain of the pixel signal PIX1 into a digital value.

First, at time t11, the dual conversion signal VDC may be activated, and thus, the floating diffusion region FD may be expanded, e.g. expanded in size, to the expanded floating diffusion region FD'. At time t11, an offset may be applied to the ramp signal RAMP. In the period from t11 to t14, the switch SW1 may be turned on, and the switches SW2, SW3, and SW4 may be turned off.

At any time point between t11 and t12, the transfer control signal VTG_LCG may be activated. Accordingly, charges newly integrated by a photoelectric conversion element (e.g., PD1) after the decrease in the voltage level of the second input INN1 in the period from t8 to t9 may be integrated at/in the expanded floating diffusion region FD'. A voltage level of the second input INN1 may be decreased by the charges integrated at the expanded floating diffusion region FD' as marked by "b". Here, the transfer control signal VTG_LCG may be a transfer control signal that is applied to a transfer transistor turned on by the transfer control signal VTG_LCG in the period from t8 to t9. For example, the transfer control signals VTG_HCG and VTG_LCG may be signals that are applied to the same transfer transistor.

At time t12, a level of the ramp signal RAMP may decrease, e.g. may decrease linearly or non-linearly. The first counter CNT1 may count the counting clock signal CNT_CLK from time t12 to time t13 at which a polarity of the output OUT1 of the first comparator COMP1 changes. Accordingly, the count value CNT_LCG of an image signal corresponding to the low conversion gain may be counted in a period from t12 to t13.

Figure 5B:
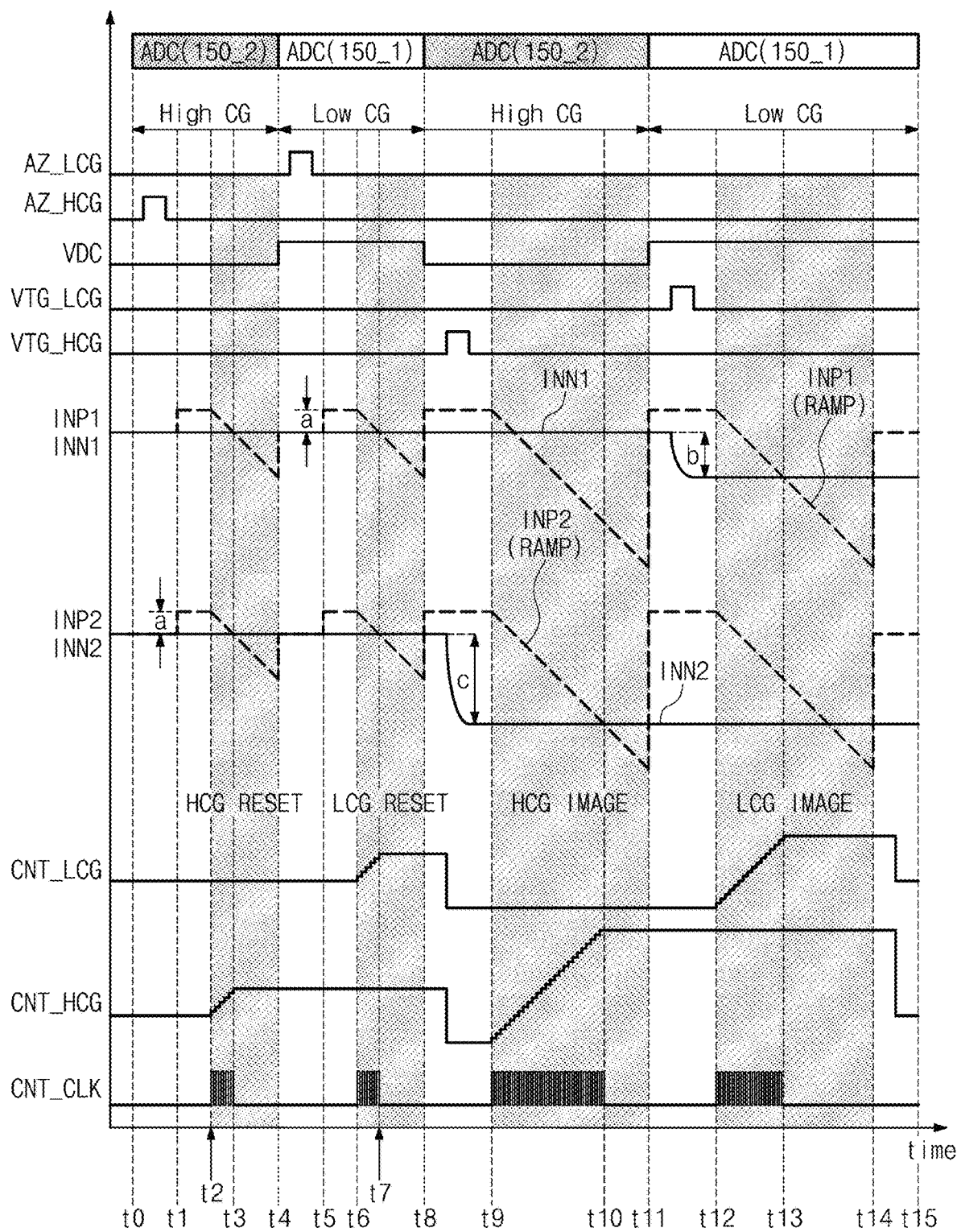

Signals that are similar to the signals of FIG. 5A are illustrated in FIG. 5B. However, unlike example embodiments of FIG. 5A, the initialization of the second ADC 150_2 may be performed prior to the initialization of the first ADC 150_1. Therefore, a timing when the auto-zero signal AZ_HCG associated with the second ADC 150_2 is activated may be advanced with respect to a timing when the auto-zero signal AZ_LCG associated with the first ADC 150_1 is activated. The dual conversion signal VDC may be deactivated in a period from t0 to t4 and may be activated in a period from t4 to t8.

Figure 5C:
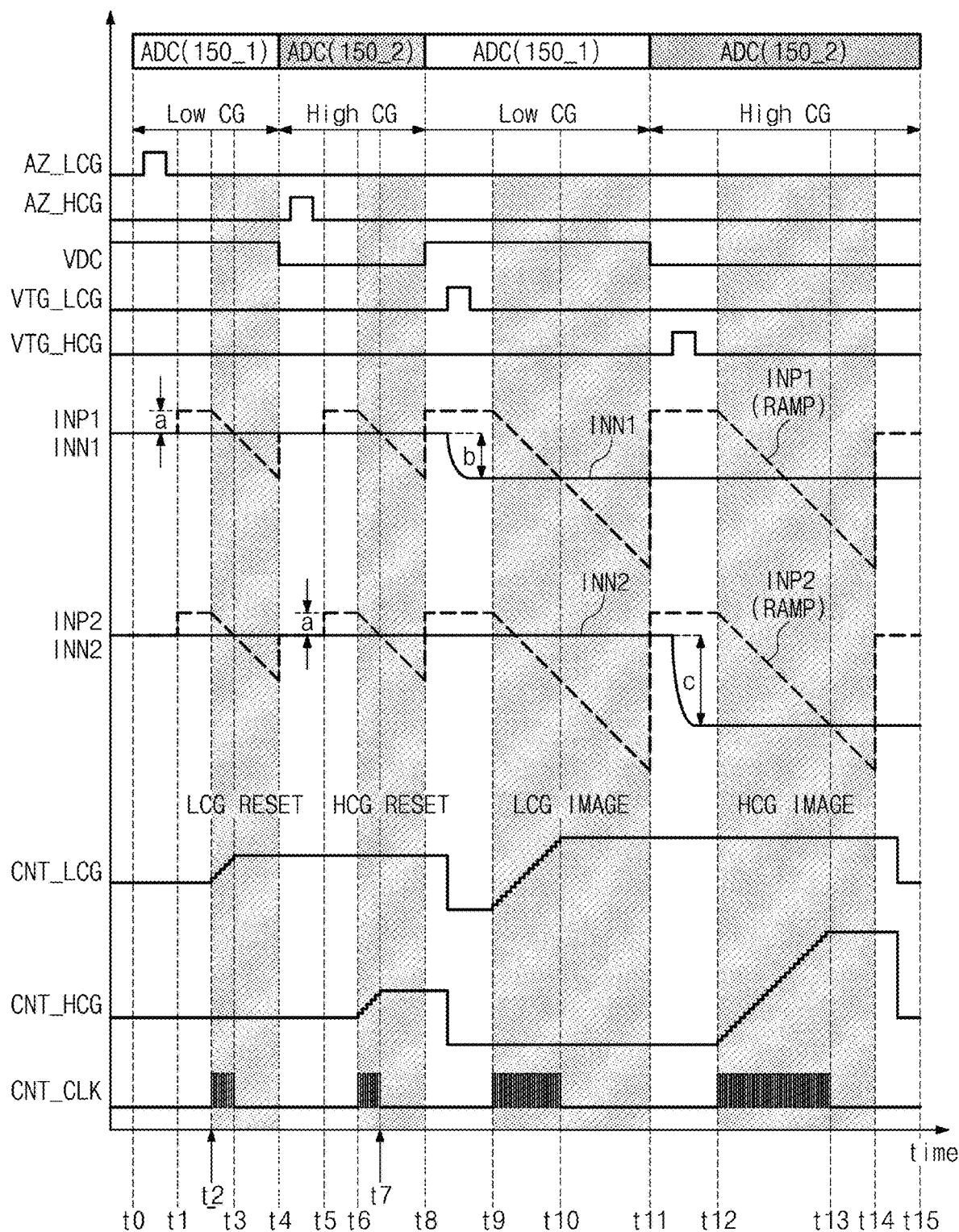

Signals that are similar to the signals of FIGS. 5A and 5B are illustrated in FIG. 5C. However, in example embodiments of FIG. 5C, the initialization of the ADCs 150_1 and 150_2 may be identical to that in example embodiments of FIG. 5A, but there may be a difference in an operation of comparing a ramp signal and a pixel signal. For example, a comparison operation of the first ADC 150_1 is executed in a period from t8 to t11, and a comparison operation of the second ADC 150_2 is executed in a period from t11 to t15. Therefore, the dual conversion signal VDC may be activated in the period from t8 to t11 and may be deactivated in the period from t11 to t14.

However, unlike example embodiments of FIGS. 5A and 5B, the decrease in the voltage level of the second input INN1 marked by "b" in the period from t8 to t9 may come from/be associated with charges stored in the floating diffusion capacitors CFD1 and CFD2 connected with the expanded floating diffusion region FD'. In addition, the decrease in the voltage level of the second input INN2 marked by "c" in the period from t11 to t12 may come from/be associated with charges stored in the first floating diffusion capacitor CFD1 connected with the floating diffusion region FD.

Figure 5D:
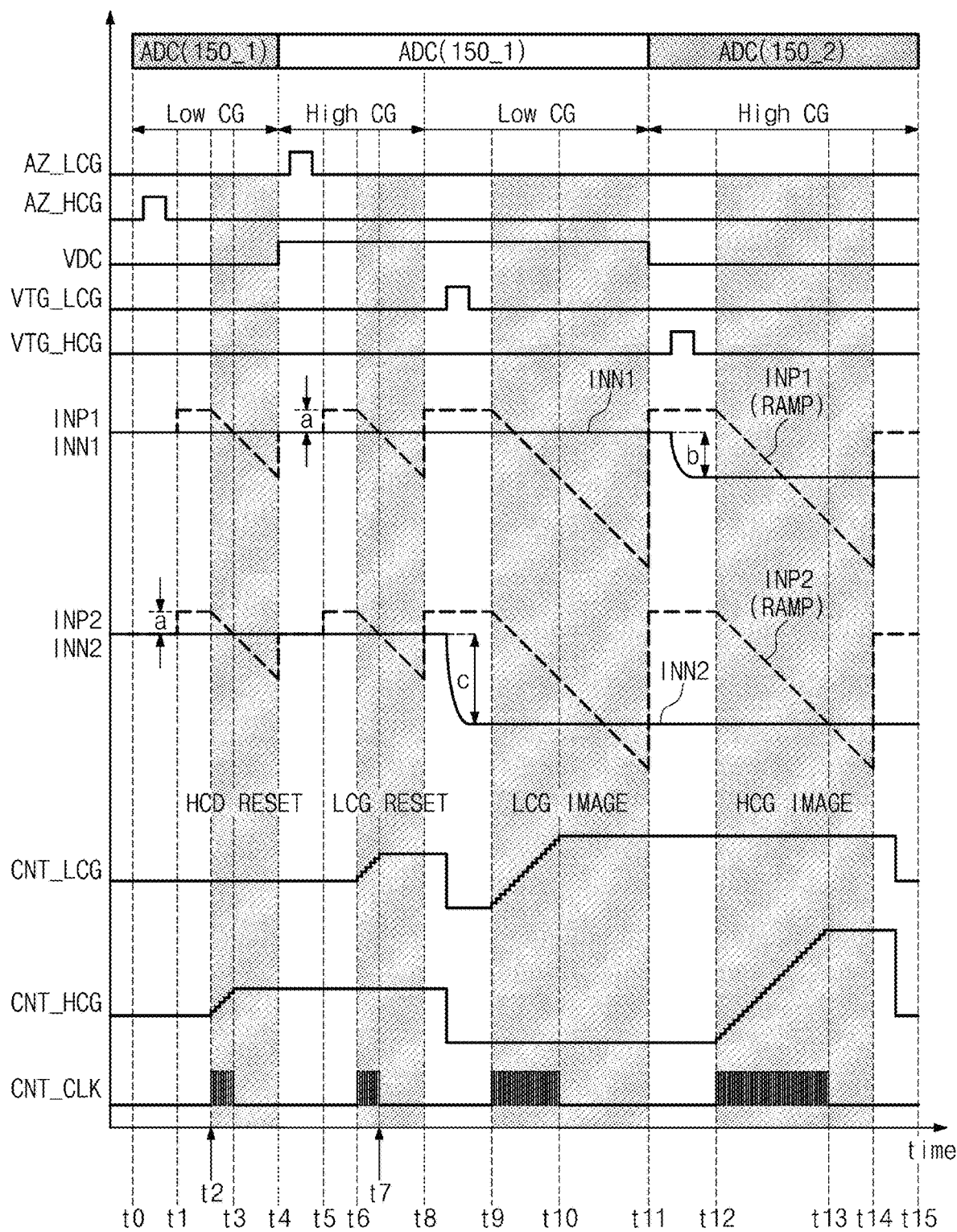

Signals that are similar to the signals of FIGS. 5A to 5C are illustrated in FIG. 5D. In example embodiments of FIG. 5D, the initialization of the ADCs 150_1 and 150_2 may be identical to that in the embodiment of FIG. 5B, and an operation of comparing a ramp signal and a pixel signal is identical to that in the embodiment of FIG. 5B. Thus, additional description will be omitted to avoid redundancy.

Example embodiments are described above as the counters CNT1 and CNT2 convert a pixel signal into a digital signal through bit conversion and up-counting, but example embodiments are not limited thereto. For example, the counters CNT1 and CNT2 may be implemented in various schemes. In a case where a pixel signal is completely converted into a digital signal, the ADCs 150_1 and 150_2 may be initialized for the correlated double sampling associated with a next pixel (e.g., the second pixel PX2 or the third pixel PX3).

Figure 6:
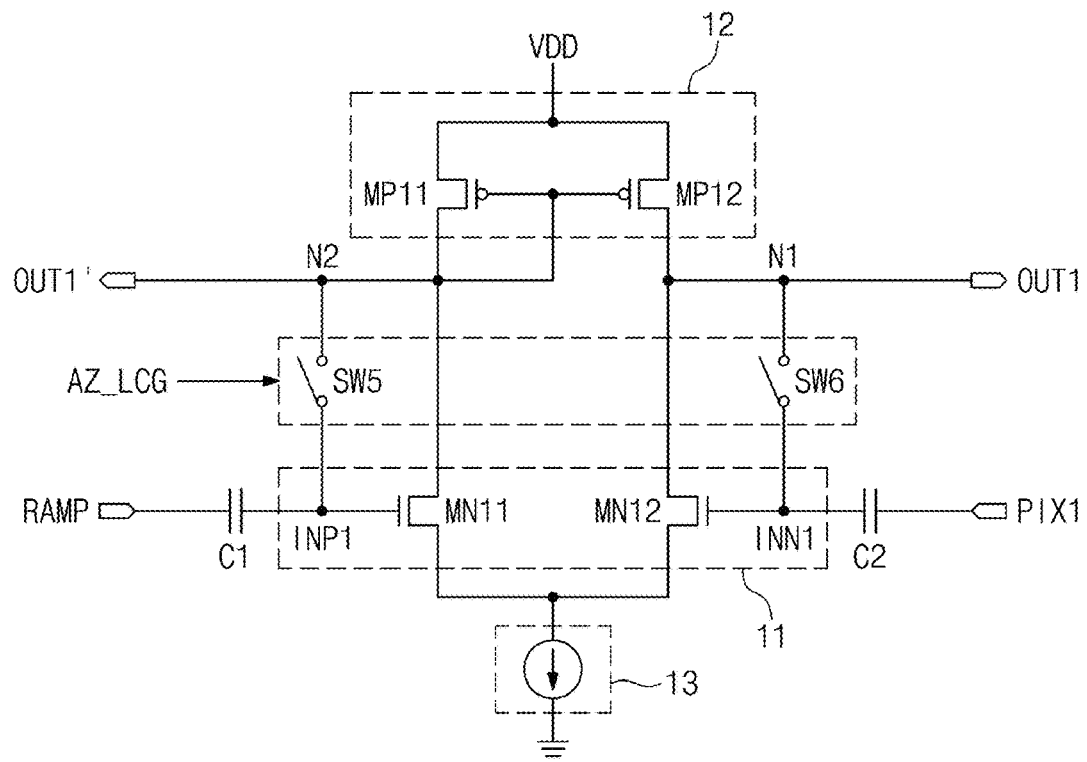
FIG. 6 illustrates a circuit diagram of a first comparator illustrated in FIG. 4.

FIG. 6 illustrates a circuit diagram of the first comparator COMP1 illustrated in FIG. 4. The first comparator COMP1 may include an input circuit 11, an output circuit 12, a current source 13, and switches SW5 and SW6. For example, the first comparator COMP1 and the second comparator COMP2 may be substantially identical; however, there may be a difference in a timing when an auto-zero signal is input. Accordingly, the first comparator COMP1 to receive the auto-zero signal AZ_LCG will be described with reference to FIG. 6.

The input circuit 11 may receive the first input INP1 and the second input INN1. For example, the ramp signal RAMP of FIG. 5A may be received as the first input INP1, and the first pixel signal PIX1 may be received as the second input INN1. The input circuit 11 may include NMOS transistors MN11 and MN12. The input circuit 11 may generate a current according to a level difference of the first input INP1 and the second input INN1. When a level of the first input INP1 and a level of the second input INN1 are equal, currents of the same level may flow through the transistors MN11 and MN12. In contrast, when the level of the first input INP1 and the level of the second input INN1 are different, currents of different levels may flow through the transistors MN11 and MN12.

The output circuit 12 may generate output voltages OUT1 and OUT1', levels of which are determined according to current mirroring. The output circuit 12 may include PMOS transistors MP11 and MP12. When a voltage level of the first input INP1 is higher than/greater than a voltage level of the second input INN1, the amount of current flowing through the transistor MN11 may be greater than the amount of current flowing through the transistor MN12. Accordingly, a voltage level of a first node N1 may increase. On the other hand, when a voltage level of the first input INP1 is lower than/smaller than (or equal to) a voltage level of the second input INN1, a voltage level of a first node N1 may decrease. The output circuit 12 may output a current that is generated based on a difference between voltage levels of the first input INP1 and the second input INN1.

Meanwhile, as described above, because the switches SW5 and SW6 are turned on during the auto-zero period, the second input INN1 and the first node N1 may be connected to each other, and the first input INP1 and the second node N2 may be connected to each other. Accordingly, voltage levels of the first input INP1, the second input INN1, the first node N1, and the second node N2 may be equalized. A voltage of the first input INP1, the second input INN1, the first node N1, and the second node N2, which are equalized in the auto-zero period, may be called an "auto-zero voltage".

According to some example embodiments described with reference to FIGS. 4 to 6, an operation associated with high conversion may be performed by charges stored in the first floating diffusion capacitor CFD1, and an operation associated with low conversion may be performed by charges stored in the first and second floating diffusion capacitors CFD1 and CFD2. For example, unlike a general way to obtain an HDR image with exposure times of pixels different, because an HDR image is obtained in a state where exposure time points (or times) of pixels are identically maintained, the motion artifact may be prevented, or reduced in likelihood of occurrence.

Meanwhile, the way to obtain an HDR image by using an image signal corresponding to the low conversion gain and an image signal corresponding to the high conversion gain is described in the above example embodiments. In addition, a way to increase a dynamic range by controlling a slope of a ramp signal input to a comparator may be further considered. This will be described with reference to FIGS. 7 and 8.

Figure 7:
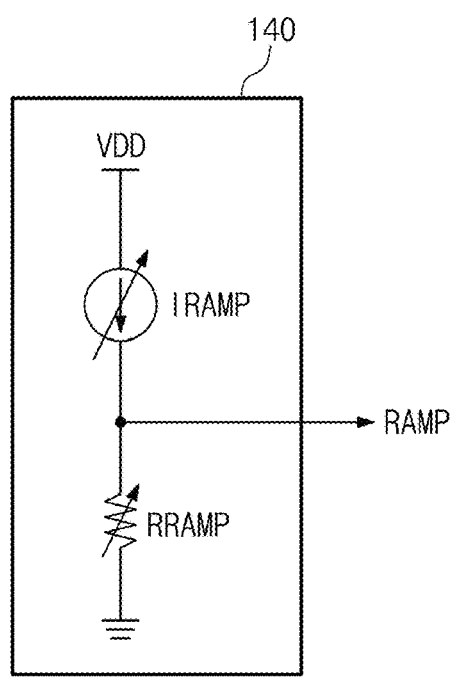
FIG. 7 illustrates an example configuration of a ramp signal generator of FIG. 1.
Figure 8:
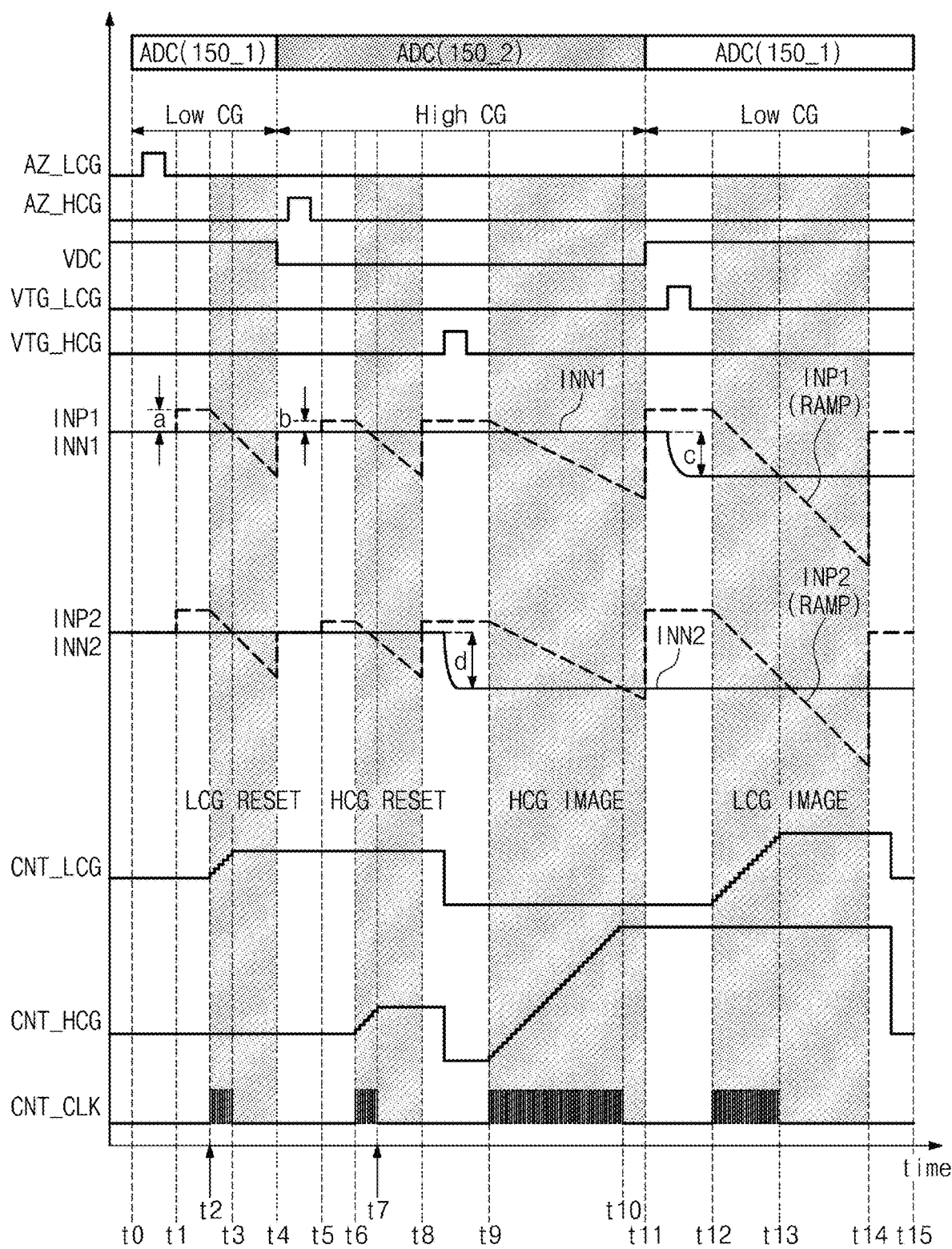
FIG. 8 is a timing diagram of an ADC of FIG. 4 when a slope of a ramp signal is changed.

FIG. 7 illustrates an example configuration of the ramp signal generator 140 of FIG. 1. FIG. 8 is a timing diagram of an ADC of FIG. 4 when a slope of the ramp signal RAMP is changed. FIG. 8 shows the ramp signal RAMP modified in a partial period of the timing diagram of FIG. 5A, and the timing diagram of FIG. 8 is substantially similar to the timing diagram of FIG. 5A. For example, that the first ADC 150_1 associated with the low conversion gain is reset in the period from t0 to t4 and performs a comparison operation in the period from t11 to t15 is identical to that of FIG. 5A. Below, a difference will be mainly described.

Referring to FIGS. 7 and 8, the ramp signal generator 140 may include a ramp current source IRAMP and a ramp resistor RRAMP. The ramp current source IRAMP may include a variable current source. A first end of the ramp current source IRAMP may be connected with a power terminal VDD, and a second end thereof may be connected with the ramp resistor RRAMP. As a current flows from the ramp current source IRAMP to the ramp resistor RRAMP, the ramp signal RAMP may be generated.

At time t5, to convert a reset component of the pixel signal PIX1 input to the second ADC 150_2 into a digital signal, an offset "b" may be applied to the ramp signal RAMP. However, the offset "b" applied to the ramp signal RAMP at t5 may be different from (e.g. greater than or less than) the offset "a" applied to the ramp signal RAMP at t1.

A level of the ramp signal RAMP may decrease from time t6, and an absolute value of a slope of the ramp signal RAMP in the period from t6 to t8 may be smaller than/less than an absolute value of a slope of the ramp signal RAMP in the period from t2 to t4. The second counter CNT2 may count the counting clock signal CNT_CLK from time t6 to time t7 at which a polarity of the output OUT2 of the second comparator COMP2 changes. As a counting result, the count value CNT_HCG may increase in the period from t6 to t7.

At time t8, the offset "b" may be applied to the ramp signal RAMP for the purpose of converting an image signal input to the second ADC 150_2 into a digital signal. The offset "b" applied to the ramp signal RAMP at t8 may be identical to the offset "b" applied to the ramp signal RAMP at t5. At time t8 or at any time point between t8 and t9, bits of the count values CNT_HCG and CNT_LCG may be inverted. At any time point between t8 and t9, the transfer control signal VTG_HCG may be activated, and thus, a voltage level of the second input INN2 may decrease.

At time t9, a level of the ramp signal RAMP may decrease to generate a digital value corresponding to the image signal. A slope of the ramp signal RAMP in the period from t9 to t11 may be identical to/substantially identical to a slope of the ramp signal RAMP in the period from t6 to t8. However, unlike the period from t9 to t10 illustrated in FIG. 5A, because the ramp signal RAMP smoothly decreases in the period from t9 to t10, the count value CNT_HCG may be different from the count value CNT_HCG of FIG. 5A. The second counter CNT2 may count the counting clock signal CNT_CLK in the period from t9 to t10, and the digital value CNT_HCG of the image signal corresponding to the high conversion gain may be counted in the period from t9 to t10.

A non-limiting example for checking an additional effect when a slope of the ramp signal RAMP is changed, in addition to the use of the dual conversion gain, is as follows. For example, it is assumed that a ratio of the high conversion gain and the low conversion gain is 8:1 (i.e., $2^3$:1), and a ratio of the high ramp gain (gradual ramp gradient) corresponding to the period from t9 to t11 and the low ramp gain (steep ramp gradient) corresponding to the period from t12 to t14 is 4:1 (i.e., $2^2$:1).

In a case of implementing an HDR image by using the dual conversion gain according to some example embodiments, which is illustrated in FIG. 5A, the number of bits of image data to be processed by an image sensor is "the number of bits of an ADC+3 bits". However, in the case of using the dual conversion gain and a change of a slope of the ramp signal RAMP according to some example embodiments, which are illustrated in FIG. 8, there may be obtained image data, of which the number of bits is "the number of bits of an ADC+(3+2) bits".

Figure 9A:
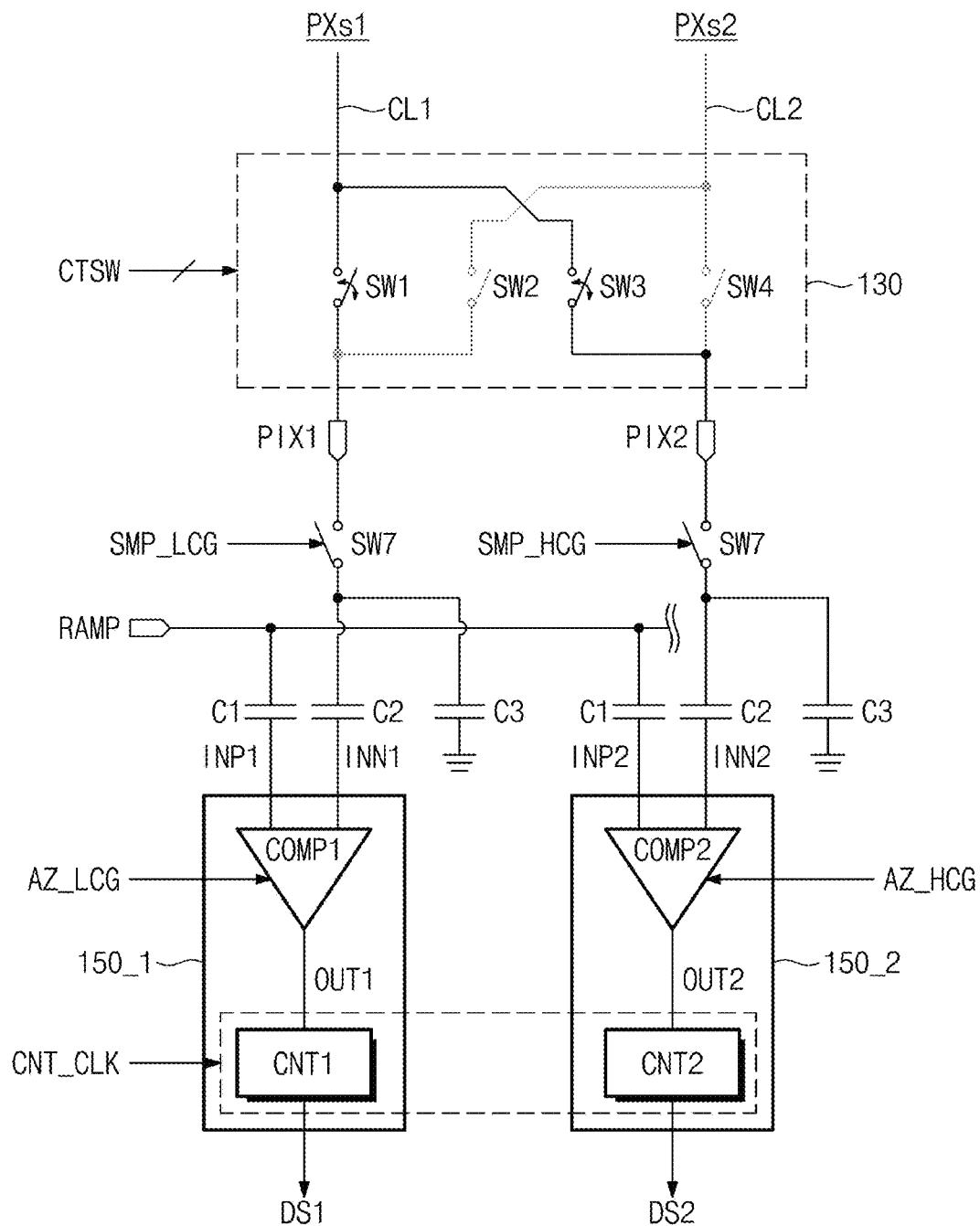
FIGS. 9A and 9B illustrate an example configuration of a switching circuit and ADCs of FIG. 1.
Figure 9B:
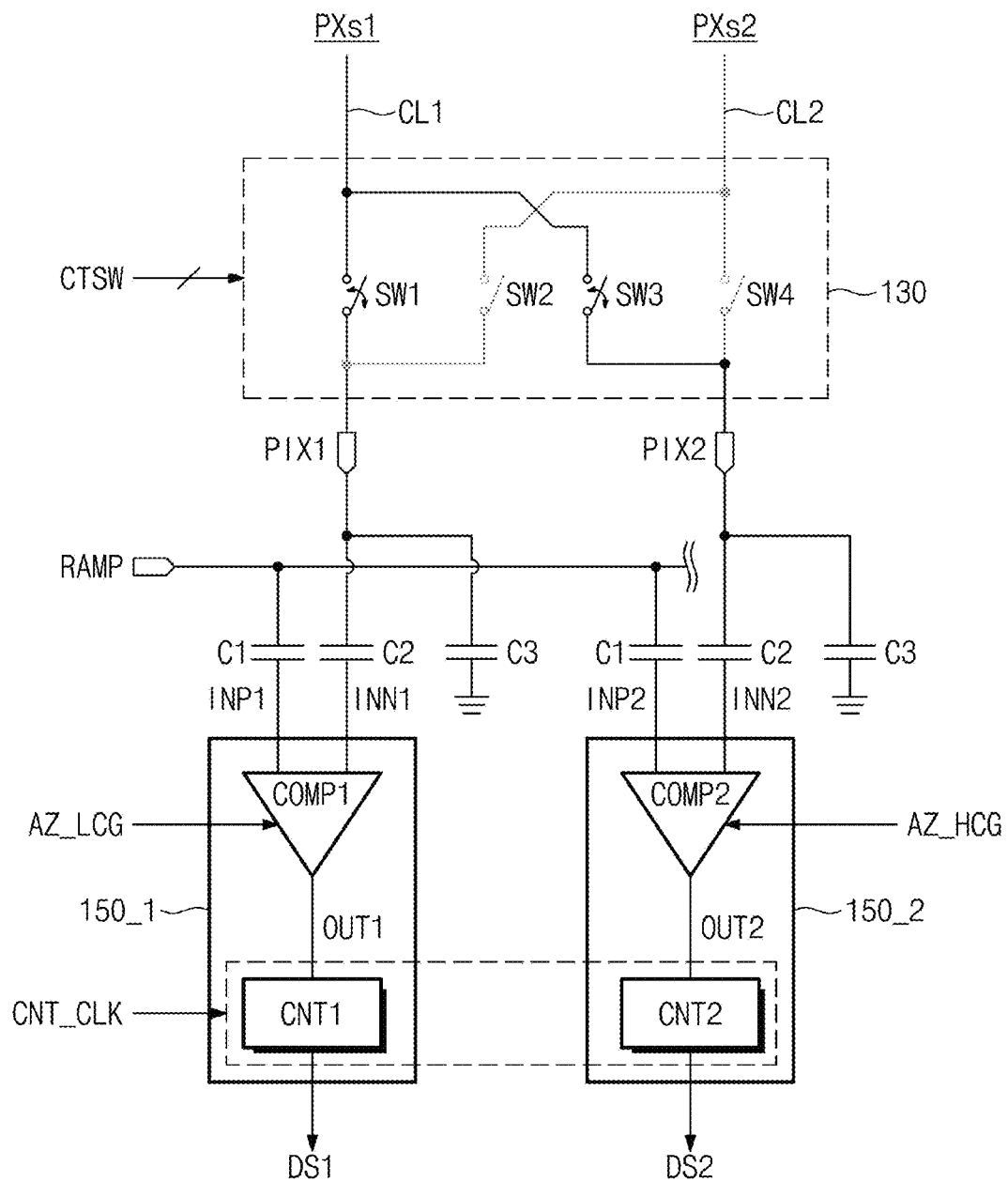
Figure 10:
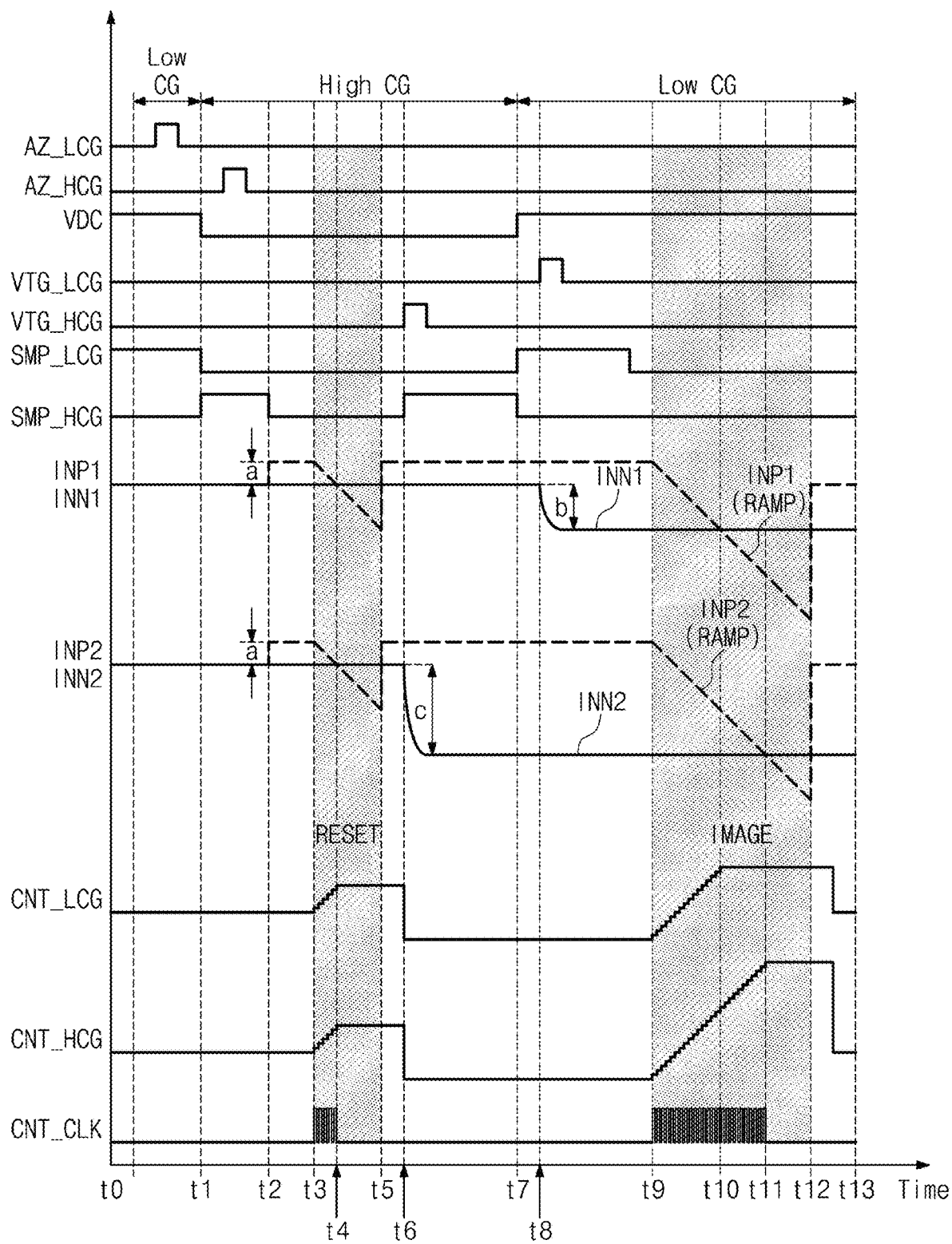
FIG. 10 is a timing diagram of an ADC of FIG. 9A and/or FIG. 9B.

FIGS. 9A and 9B illustrate an example configuration of a switching circuit and ADCs of FIG. 1. FIG. 10 is a timing diagram of an ADC of FIG. 9A and/or FIG. 9B. First, an operation of an ADC of some example embodiments will be described with reference to FIGS. 2, 9A, and 10 together.

The first ADC 150_1 includes the first comparator COMP1 and the first counter CNT1, and the second ADC 150_2 includes the second comparator COMP2 and the second counter CNT2. However, capacitors C1, C2, and C3 connected with the first ADC 150_1 may be regarded as being components of the first ADC 150_1, and capacitors C1, C2, and C3 connected with the second ADC 150_2 may be regarded as being components of the second ADC 150_2. Unlike the embodiment of FIG. 4, one end of the capacitor C3 may be connected with a ground node. The capacitor C3 corresponding to the second comparator COMP2 is used to store an absolute value of a potential corresponding to charges integrated at the floating diffusion region FD, and the capacitor C3 corresponding to the first comparator COMP1 is used to store an absolute value of a potential corresponding to charges integrated at the expanded floating diffusion region FD'.

The first comparator COMP1 receives the ramp signal RAMP through the first capacitor C1 as the first input INP1 and receives the first pixel signal PIX1 through the second capacitor C2 as the second input INN1. Here, the first pixel signal PIX1 may be a signal output from the first pixel PX1.

The first comparator COMP1 may perform processing associated with the low conversion gain. The first comparator COMP1 may sequentially sample and hold a reset component and an image component of the first pixel signal PIX1. Unlike the above embodiments, in this embodiment, because one reset component and one image component of the ramp signal RAMP are used, sampling and holding may be required.

In the auto-zero period, the first comparator COMP1 may be initialized based on the reset component of the first pixel signal PIX1. The first comparator COMP1 may compare a held image component with the ramp signal RAMP and may output the comparison result OUT1. The output OUT1 of the first comparator COMP1 may be provided to the first counter CNT1. The first counter CNT1 may count the comparison result OUT1 received from the first comparator COMP1 to generate the digital signal DS1.

The second comparator COMP2 may perform processing associated with the high conversion gain. The second comparator COMP2 may sequentially sample and hold a reset component and an image component of the first pixel signal PIX1.

In the auto-zero period, the second comparator COMP2 may be initialized based on the reset component of the first pixel signal PIX1. The second comparator COMP2 may compare a held image component with the ramp signal RAMP and may output the comparison result OUT2. The output OUT2 of the second comparator COMP2 may be provided to the second counter CNT2. The second counter CNT2 may count the comparison result OUT2 received from the second comparator COMP2 to generate the digital signal DS2.

Referring to the timing diagram of FIG. 10, in a period from t0 to t1, the dual conversion signal VDC may be activated. In the period from t0 to t1, the switch SW1 may be turned on, and the switches SW2, SW3, and SW4 may be turned off. In the period from t0 to t1, the ADC 150_1 associated with the low conversion gain may be initialized by the activated auto-zero signal AZ_LCG. A sampling signal SMP_LCG may be activated in the period from t0 to t1, and a reset component of the first pixel signal PIX1 may be sampled by the capacitor C1 connected with the first comparator COMM. In a period from t1 to t5, the sampled reset component of the first pixel signal PIX1 may be held.

In a period from t1 to t2, the ADC 150_2 associated with the high conversion gain may be initialized by the activated auto-zero signal AZ_HCG. A sampling signal SMP_HCG may be activated in the period from t1 to t2, and the reset component of the first pixel signal PIX1 may be sampled by the capacitor C2 connected with the second comparator COMP2. In a period from t1 to t7, the dual conversion signal VDC may be deactivated. In the period from t1 to t7, the switch SW3 may be turned on, and the switches SW1, SW2, and SW4 may be turned off.

To convert the reset component of the pixel signal PIX1 input to the ADCs 150_1 and 150_2 into a digital signal, an offset may be applied to the ramp signal RAMP at time t2, and then, a level of the ramp signal RAMP may decrease from time t3. The first counter CNT1 may count the counting clock signal CNT_CLK from time t3 to time t4 at which a polarity of the output OUT1 of the first comparator COMP1 changes. The second counter CNT2 may count the counting clock signal CNT_CLK from time t3 to time t4 at which a polarity of the output OUT2 of the second comparator COMP2 changes. As a counting result, the count values CNT_LCG and CNT_HCG may increase in the period from t3 to t4.

At time t5, an offset may be applied to the ramp signal RAMP for the purpose of converting an image signal corresponding to the high conversion gain into a digital signal. At time t5 or at any time point between t5 and t6, bits of the count values CNT_LCG and CNT_HCG respectively counted by the counters CNT1 and CNT2 may be inverted in response to the inversion signal generated by the timing controller 160.

At time t6, the transfer control signal VTG_HCG may be activated, and a voltage level of the second input INN2 of the second comparator COMP2 may be decreased by charges integrated at the floating diffusion region FD as much as "c" as illustrated in FIG. 10. The sampling signal SMP_HCG may be activated in a period from t5 to t7, and the decreased level of the second input INN2 may be maintained at a holding voltage VHLD_HCG by the capacitor C3 corresponding to the first comparator COMP1 in a portion of the period from t5 to t7.

At time t7, the dual conversion signal VDC may be activated, and thus, the floating diffusion region FD may be expanded to the expanded floating diffusion region FD'. In a period from t7 to t13, the switch SW1 may be turned on, and the switches SW2, SW3, and SW4 may be turned off.

At time t8, the transfer control signal VTG_LCG may be activated. Accordingly, charges newly integrated by a photoelectric conversion element after the decrease in the voltage level of the second input INN2 at time t6 are integrated at the expanded floating diffusion region FD'. A voltage level of the second input INN1 of the first comparator COMP1 may be decreased by the charges integrated at the expanded floating diffusion region FD' as much as "b" as illustrated in FIG. 10. The sampling signal SMP_LCG may be activated in a period from t7 to t9, and the decreased level of the second input INN1 may be maintained at a holding voltage VHLD_LCG by the capacitor C3 corresponding to the second comparator COMP2 in a portion of a period from t8 to t9.

Meanwhile, in the embodiment of FIG. 10, because a level of the holding voltage VHLD_LCG is maintained by the capacitor C3 corresponding to the first comparator COMP1 and a level of the holding voltage VHLD_HCG is maintained by the capacitor C3 corresponding to the second comparator COMP2, it is possible to convert an image signal corresponding to the low conversion gain and an image signal corresponding to the high conversion gain into digital signals at the same time.

For example, at time t9, a level of the ramp signal RAMP may decrease. The first counter CNT1 may count the counting clock signal CNT_CLK from time t9 to time t10 at which a polarity of the output OUT1 of the first comparator COMP1 changes (the reason is that the first comparator COMP1 compares the ramp signal RAMP with the holding voltage VHLD_LCG). Accordingly, the count value CNT_LCG of the image signal corresponding to the low conversion gain may be counted in a period from t9 to t10.

The second counter CNT2 may count the counting clock signal CNT_CLK from time t9 to time t11 at which a polarity of the output OUT2 of the second comparator COMP2 changes (the reason is that the second comparator COMP2 compares the ramp signal RAMP with the holding voltage VHLD_HCG). Accordingly, the count value CNT_HCG of the image signal corresponding to the high conversion gain may be counted in a period from t9 to t11.

The count value CNT_LCG counted by the first counter CNT1 corresponds to the digital signal DS1 associated with the low conversion gain, and the count value CNT_HCG counted by the second counter CNT2 corresponds to the digital signal DS2 associated with the high conversion gain. Finally, the digital signals DS1 and DS2 may be used for HDR processing.

Figure 11:
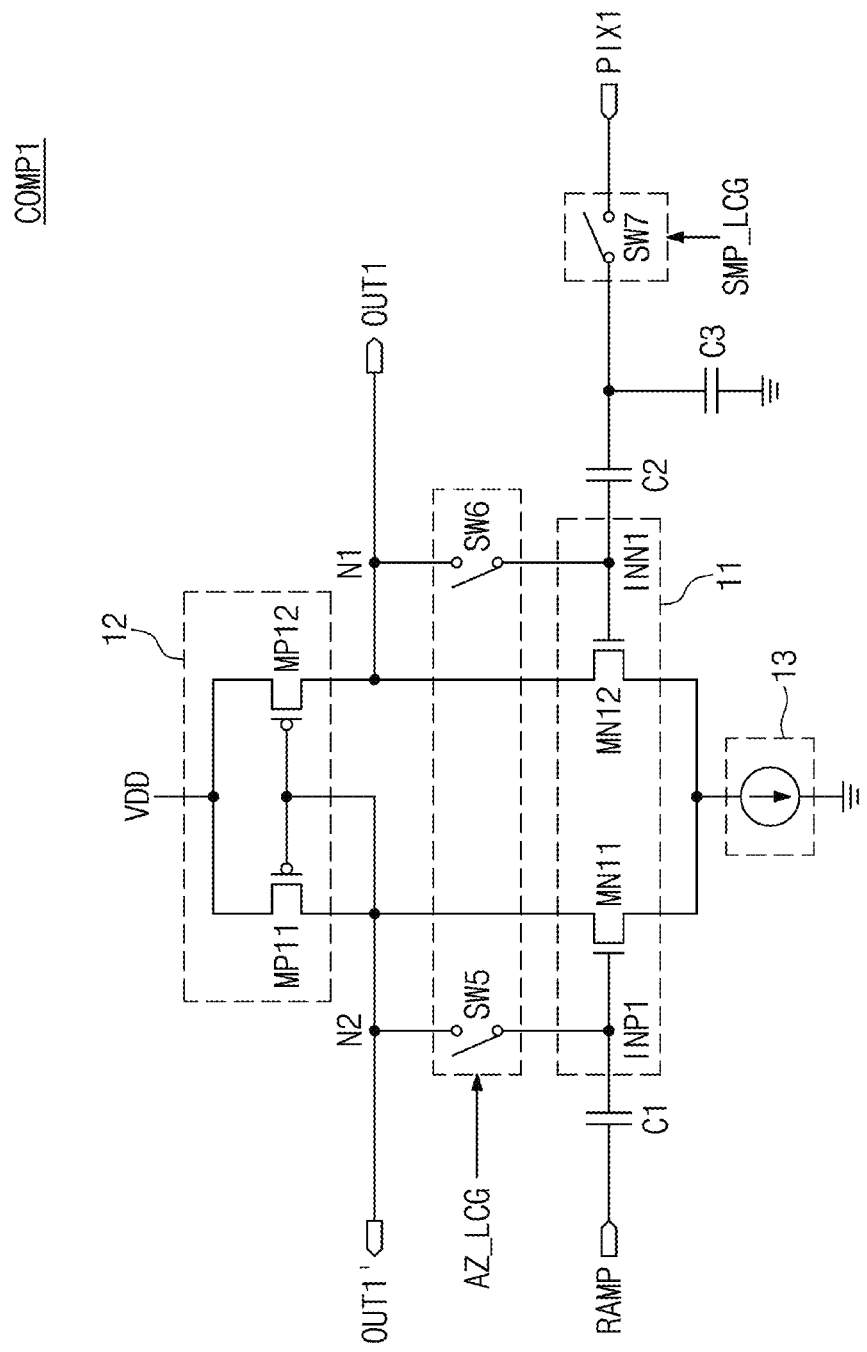
FIG. 11 illustrates a circuit diagram of a first comparator illustrated in FIG. 9.

FIG. 11 illustrates a circuit diagram of the first comparator COMP1 illustrated in FIG. 9. The first comparator COMP1 may include the input circuit 11, the output circuit 12, the current source 13, and switches SW5 to SW7. For example, the first comparator COMP1 and the second comparator COMP2 may be substantially identical, but there may be a difference in a timing when an auto-zero signal is input, as described with reference to the circuit diagram of FIG. 11. Accordingly, the first comparator COMP1 to receive the auto-zero signal AZ_LCG will be described with reference to FIG. 11.

The input circuit 11 may receive the first input INP1 and the second input INN1. For example, the ramp signal RAMP of FIG. 10 may be received as the first input INP1, and the first pixel signal PIX1 may be received as the second input INN1. The input circuit 11 may include the NMOS transistors MN11 and MN12. The input circuit 11 may generate a current according to a level difference of the first input INP1 and the second input INN1. When a level of the first input INP1 and a level of the second input INN1 are equal, currents of the same level may flow through the transistors MN11 and MN12. In contrast, when the level of the first input INP1 and the level of the second input INN1 are different, currents of different levels may flow through the transistors MN11 and MN12.

In the period from t8 to t9 of FIG. 10, when the switch SW7 is turned on by the activated sampling signal SMP_LCG, charges corresponding to the first pixel signal PIX1 may be stored (e.g., sampled) and maintained (e.g., held) in the capacitor C3. In addition, because a voltage of the second input INN1 is sampled and held, the first counter CNT1 may perform counting at the same time with the second counter CNT2 at time t9. The remaining components of the first comparator COMP1 are mostly similar to those of the first comparator COMP1 of FIG. 6, and thus, additional description will be omitted to avoid redundancy.

Figure 12:
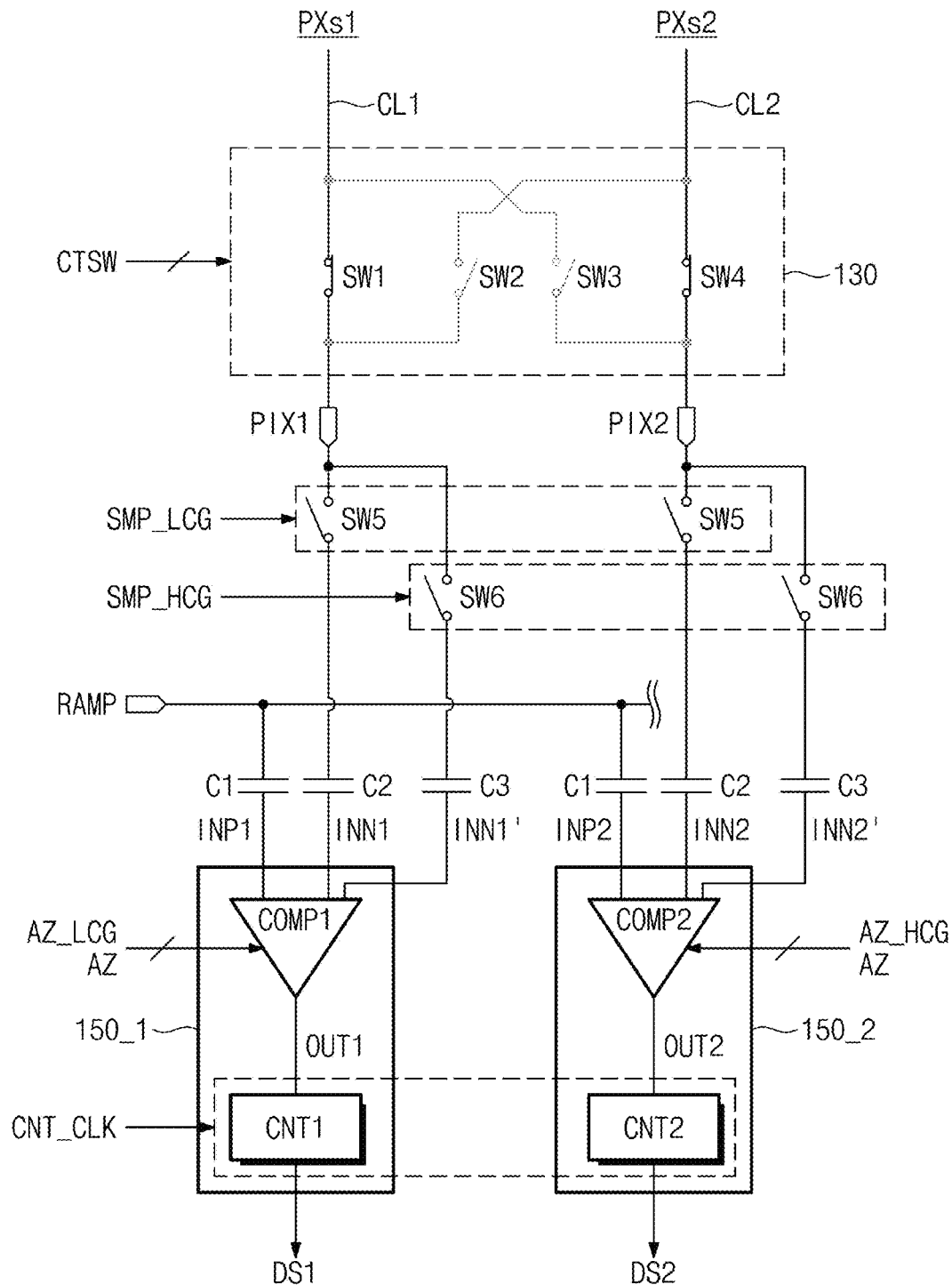
FIG. 12 illustrates an example configuration of a switching circuit and ADCs of FIG. 1.
Figure 13:
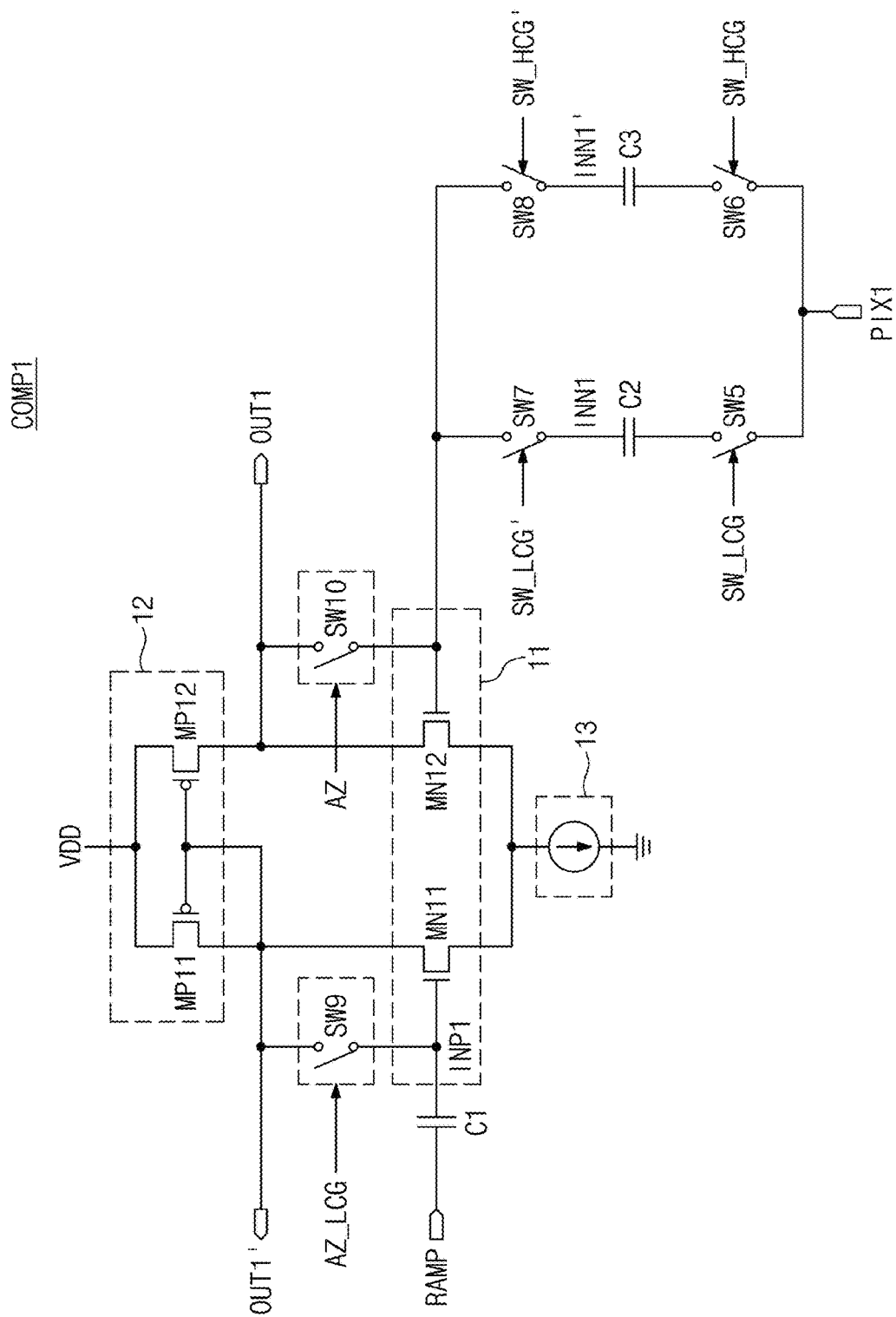
FIG. 13 illustrates a circuit diagram of a comparator illustrated in FIG. 12.
Figure 14:
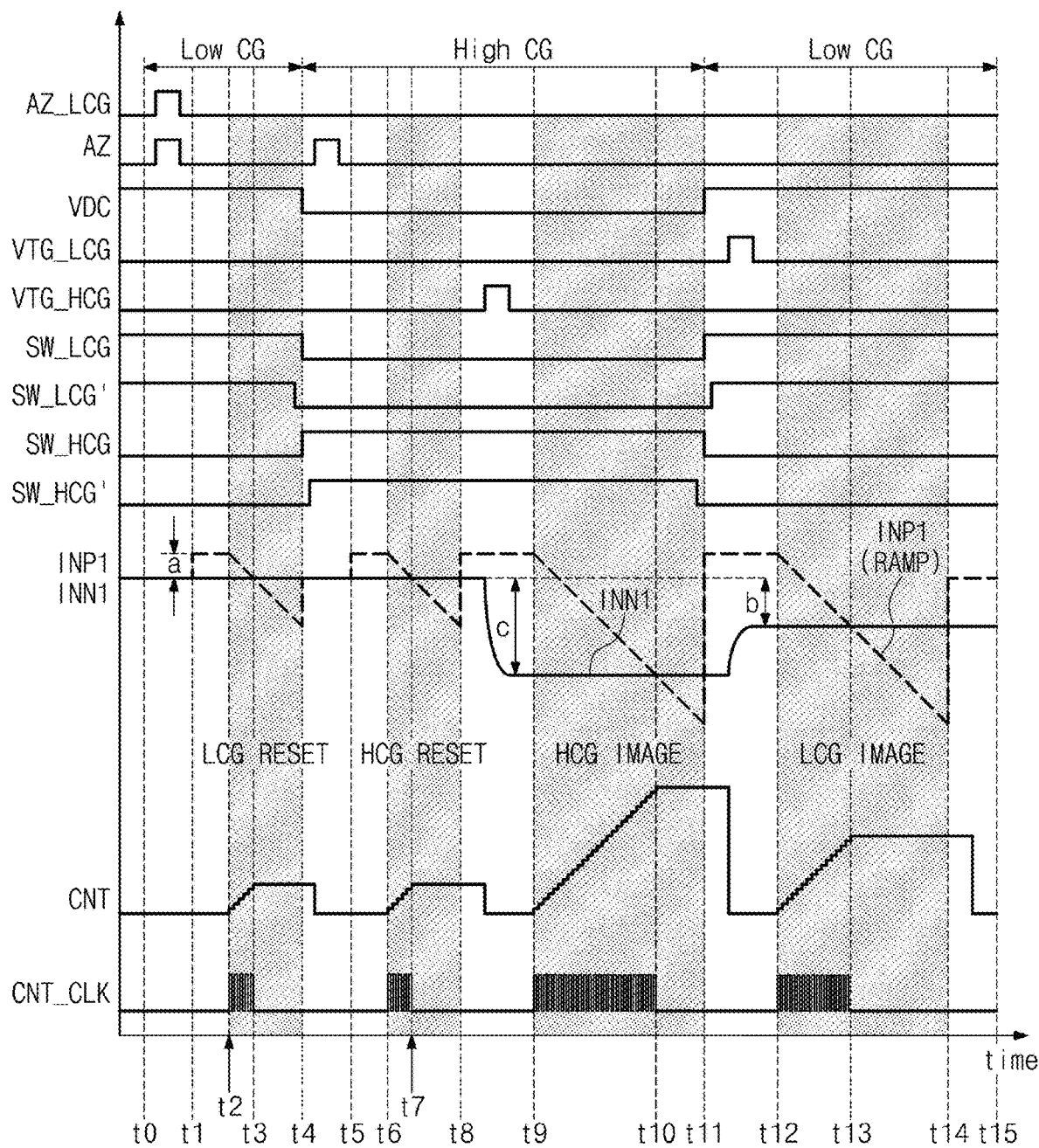
FIG. 14 is a timing diagram of an ADC of FIG. 12.

FIG. 12 illustrates an example configuration of a switching circuit and ADCs of FIG. 1. FIG. 13 illustrates a circuit diagram of the comparator COMP1 illustrated in FIG. 12. FIG. 14 is a timing diagram of an ADC of FIG. 12. Unlike the above embodiments, according to the embodiment of FIG. 12, one ADC (e.g., 150_1) simultaneously performs processing associated with the low conversion gain and processing associated with the high conversion gain on the pixel signal PIX output from one pixel group (e.g., PXs1). Therefore, only the ADC 150_1 will be described.

Referring to FIGS. 12 and 13, the switching circuit 130 may include the switches SW1, SW2, SW3, and SW4. In the first mode and the second mode, the switches SW1 and SW4 may be turned on, and the switches SW2 and SW3 may be turned off.

The ADC 150_1 includes the capacitors C1, C2, and C3, the comparator COMP1, and the counter CNT1. Unlike the embodiments of FIGS. 4 and 9, the capacitors C2 and C3 may be connected in parallel with the comparator COMP1. However, one of the capacitors C2 and C3 may be selectively connected with the comparator COMP1 depending on whether the ADC 150_1 performs processing associated with the low conversion gain or performs processing associated with the high conversion gain. To this end, the switches SW5 and SW6 may be respectively connected with the capacitors C2 and C3, for example, as illustrated in FIG. 12.

When the pixel signal PIX1 is received through the second capacitor C2, the comparator COMP1 may perform processing associated with the low conversion gain. In this case, the comparator COMP1 receives the ramp signal RAMP through the first capacitor C1 as the first input INP1 and receives the pixel signal PIX1 through the second capacitor C2 as the second input INN1. In the auto-zero period before a comparison operation is performed, the comparator COMP1 may be initialized in response to auto-zero signals AZ_LCG and AZ.

The comparator COMP1 may compare a component of the ramp signal RAMP corresponding to the low conversion gain with a component of the pixel signal PIX1 corresponding to the low conversion gain, and may output the comparison result OUT1. The output OUT1 of the comparator COMP1 may be provided to the counter CNT1. The counter CNT1 may count the comparison result OUT1 received from the comparator COMP1 based on the counting clock signal CNT_CLK and may generate the digital signal DS1 associated with the low conversion gain.

When the pixel signal PIX1 is received through the third capacitor C3, the comparator COMP1 may perform processing associated with the high conversion gain. Accordingly, the comparator COMP1 receives the ramp signal RAMP through the first capacitor C1 as the first input INP1 and receives the pixel signal PIX1 through the third capacitor C3 as the second input INN1. In the auto-zero period before a comparison operation is performed, the comparator COMP1 may be initialized in response to the auto-zero signal AZ.

The comparator COMP1 may compare a component of the ramp signal RAMP corresponding to the high conversion gain with a component of the pixel signal PIX1 corresponding to the high conversion gain and may output the comparison result OUT1. The output OUT1 of the comparator COMP1 may be provided to the counter CNT1. The counter CNT1 may count the comparison result OUT1 received from the comparator COMP1 based on the counting clock signal CNT_CLK and may generate the digital signal DS1 associated with the high conversion gain.

Meanwhile, the comparator COMP1 may include the input circuit 11, the output circuit 12, the current source 13, and switches SW5 to SW10. The switches SW5 to SW10 of the comparator COMP1 may be implemented as illustrated in FIG. 13, so as to establish a path associated with the low conversion gain and a path associated with the high conversion gain.

In an operation associated with the low conversion gain of the comparator COMP1, the switches SW5 and SW7 may be respectively turned on by switch control signals SW_LCG and SW_LCG', and the switches SW9 and SW10 may be respectively turned on by the auto-zero signals AZ_LCG and AZ. As a result, the comparator COMP1 may be initialized. In contrast, in an operation associated with the high conversion gain of the comparator COMP1, the switches SW6 and SW8 may be respectively turned on by switch control signals SW_HCG and SW_HCG', and the switch SW10 may be turned on by the auto-zero signal AZ. As a result, the comparator COMP1 may be initialized.

Referring to the timing diagram of FIG. 14, a period from t0 to t4 is defined as a reset period of the ADC 150_1 associated with the low conversion gain. In the period from t0 to t4, the dual conversion signal VDC may be activated. As a result, the floating diffusion region FD may be expanded to the expanded floating diffusion region FD', and ADC initialization may be performed under the low conversion gain condition corresponding to the expanded floating diffusion region FD'.

In the period from t0 to t4, the path associated with the second capacitor C2 may be established by the activation of the switch control signals SW_LCG and SW_LCG'. In a portion of the period from t0 to t1, the auto-zero signal AZ_LCG may be activated, and a configuration of the comparator COMP1 associated with the low conversion gain may be initialized in response to the auto-zero signal AZ_LCG.

At time t1, to convert a reset component of the pixel signal PIX1 corresponding to the low conversion gain into a digital signal, an offset may be applied to the ramp signal RAMP, and a level of the ramp signal RAMP may decrease from time t2. The counter CNT1 may count the counting clock signal CNT_CLK from time t2 to time t3 and may generate the count value CNT_LCG associated with the low conversion gain. At time t4 or at any time point between t4 and t5, a bit of the count value CNT counted by the counter CNT1 may be inverted in response to the inversion signal generated by the timing controller 160 (refer to FIG. 1).

A period from t4 to t8 is defined as a reset period of the ADC 150_1 associated with the high conversion gain. In a period from t4 to t11, the dual conversion signal VDC may be deactivated. Accordingly, the dual conversion transistor DCT may be turned off, and the first floating diffusion capacitor CFD1 and the second floating diffusion capacitor CFD2 may be electrically disconnected. As a result, the ADC initialization may be performed under the high conversion gain condition corresponding to the floating diffusion region FD.

In the period from t4 to t11, the path associated with the third capacitor C3 may be established by the activation of the switch control signal SW_HCG. In a portion of the period from t4 to t5, the auto-zero signal AZ may be activated, and a configuration of the comparator COMP1 associated with the high conversion gain may be initialized in response to the auto-zero signal AZ.

At time t5, to convert a reset component of the pixel signal PIX1 corresponding to the high conversion gain into a digital signal, an offset may be applied to the ramp signal RAMP, and a level of the ramp signal RAMP may decrease from time t6. The counter CNT1 may count the counting clock signal CNT_CLK from time t6 to time t7 and may generate the count value CNT increasing in the period from t6 to t7. At time t8 or at any time point between t8 and t9, a bit of the count value CNT_HCG counted by the counter CNT1 may be inverted (e.g. changed from '1' to '0' or from '0' to '1').

At time t8, an offset may be applied to the ramp signal RAMP input as the first input INP1 through the first capacitor C1 for the purpose of converting an image signal corresponding to the high conversion gain into a digital signal. At any time point between t8 and t9, the transfer control signals VTG_HCG may be activated, and thus, a voltage level of the second input INN1 input through the third capacitor C3 may be decreased as much as "c" as illustrated in FIG. 14.

At time t9, a level of the ramp signal RAMP may decrease to generate a digital value of an image signal corresponding to the high conversion gain. The counter CNT1 may count the counting clock signal CNT_CLK in a period from t9 to t10, and the digital value CNT_HCG of the image signal corresponding to the high conversion gain may be obtained in the period from t9 to t10.

In a period from t11 to t14, the path associated with the third capacitor C2 may be established by the activation of the switch control signal SW_LCG, and the dual conversion signal VDC may be activated.

At time t11, an offset may be applied to the ramp signal RAMP input as the first input INP1 through the first capacitor C1 for the purpose of converting an image signal corresponding to the low conversion gain into a digital signal. At any time point between t11 and t12, the transfer control signal VTG_LCG may be activated. Accordingly, a voltage level of the second input INN1 input through the second capacitor C2 may be increased by charges integrated at the expanded floating diffusion region FD', as much as "c-b" as illustrated in FIG. 14.

At time t12, a level of the ramp signal RAMP may decrease to generate a digital value of an image signal corresponding to the low conversion gain. The counter CNT1 may count the counting clock signal CNT_CLK in a period from t12 to t13, and the digital value CNT_HCG of the image signal corresponding to the low conversion gain may be counted in the period from t12 to t13.

Figure 15:
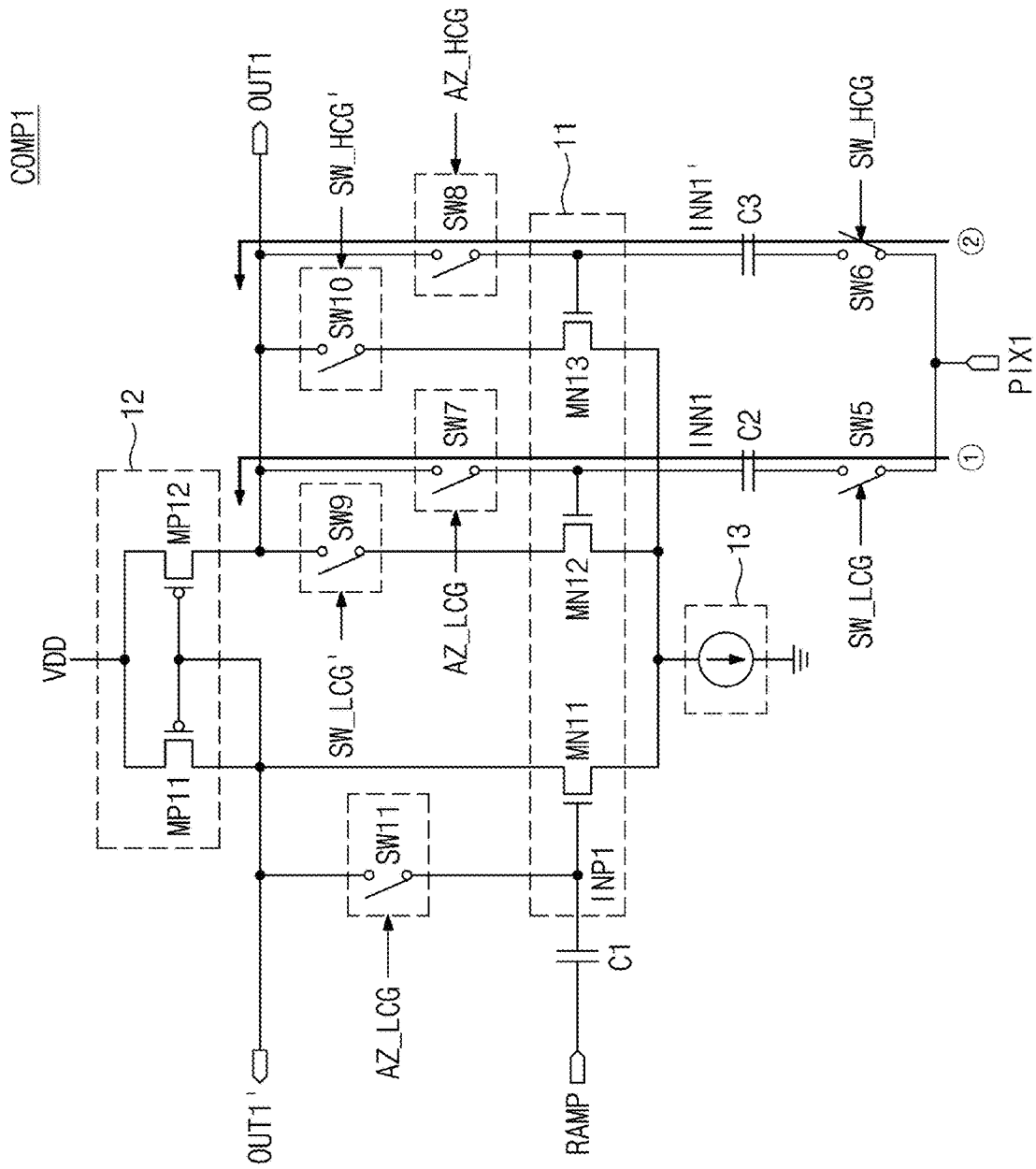
FIG. 15 illustrates a circuit diagram of a comparator illustrated in FIG. 12.
Figure 16:
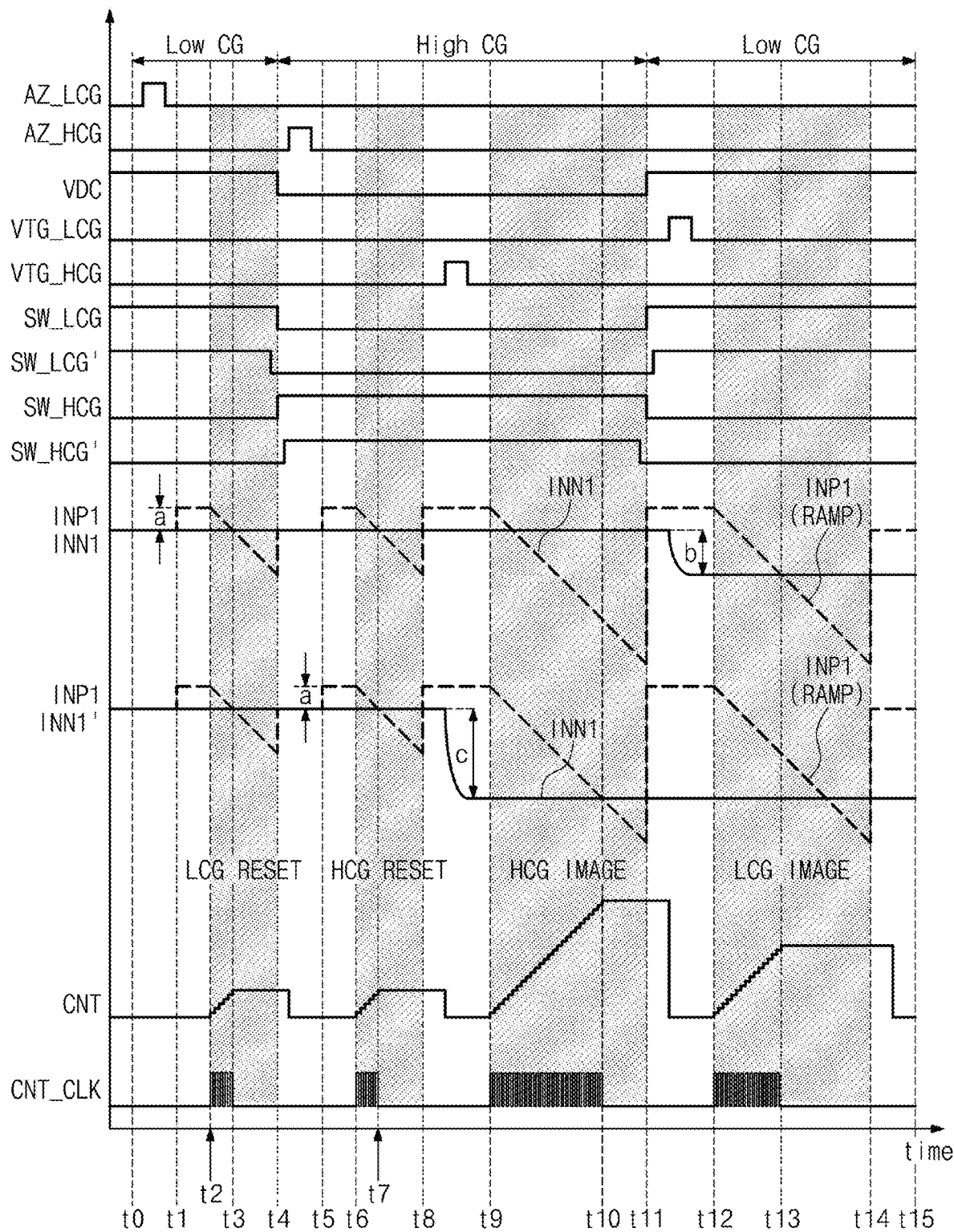
FIG. 16 is a timing diagram of an ADC of FIG. 15.

FIG. 15 illustrates a circuit diagram of the comparator COMP1 illustrated in FIG. 12. FIG. 16 is a timing diagram of an ADC of FIG. 15.

The comparator COMP1 may include the input circuit 11, the output circuit 12, the current source 13, and switches SW5 to SW11. Because the comparator COMP1 of FIG. 15 is mostly similar to the above comparators, the detailed description associated with functional blocks constituting the comparator COMP1 will be omitted.

The switches SW5 to SW11 of the comparator COMP1 may be implemented as illustrated in FIG. 15, so as to establish a path associated with the low conversion gain and a path associated with the high conversion gain. For example, a configuration for initializing the comparator COMP1 in response to the auto-zero signal AZ_LCG may be associated with a path (①of FIG. 15), where the second capacitor C2 is connected with the comparator COMM. For example, a configuration for initializing the comparator COMP1 in response to the auto-zero signal AZ_HCG may be associated with a path (② of FIG. 15), where the third capacitor C3 is connected with the comparator COMP1.

The timing diagram of FIG. 16 is mostly similar to the above timing diagrams. For example, a period from t0 to t4 may be defined as a reset period of a configuration of the ADC 150_1 associated with the low conversion gain, a period from t4 to t8 may be defined as a reset period of a configuration of the ADC 150_1 associated with the high conversion gain, a period from t8 to t11 may be defined as a comparison operation period of the configuration of the ADC 150_1 associated with the high conversion gain, and a period from t11 to t15 may be defined as a comparison operation period of the configuration of the ADC 150_1 associated with the low conversion gain.

That counting corresponding to the low conversion gain is performed in a period where the dual conversion signal VDC is activated, and counting corresponding to the high conversion gain is performed in a period where the dual conversion signal VDC is deactivated, is mostly similar to that of the above example embodiments. Thus, additional description will be omitted to avoid redundancy.

Figure 17:
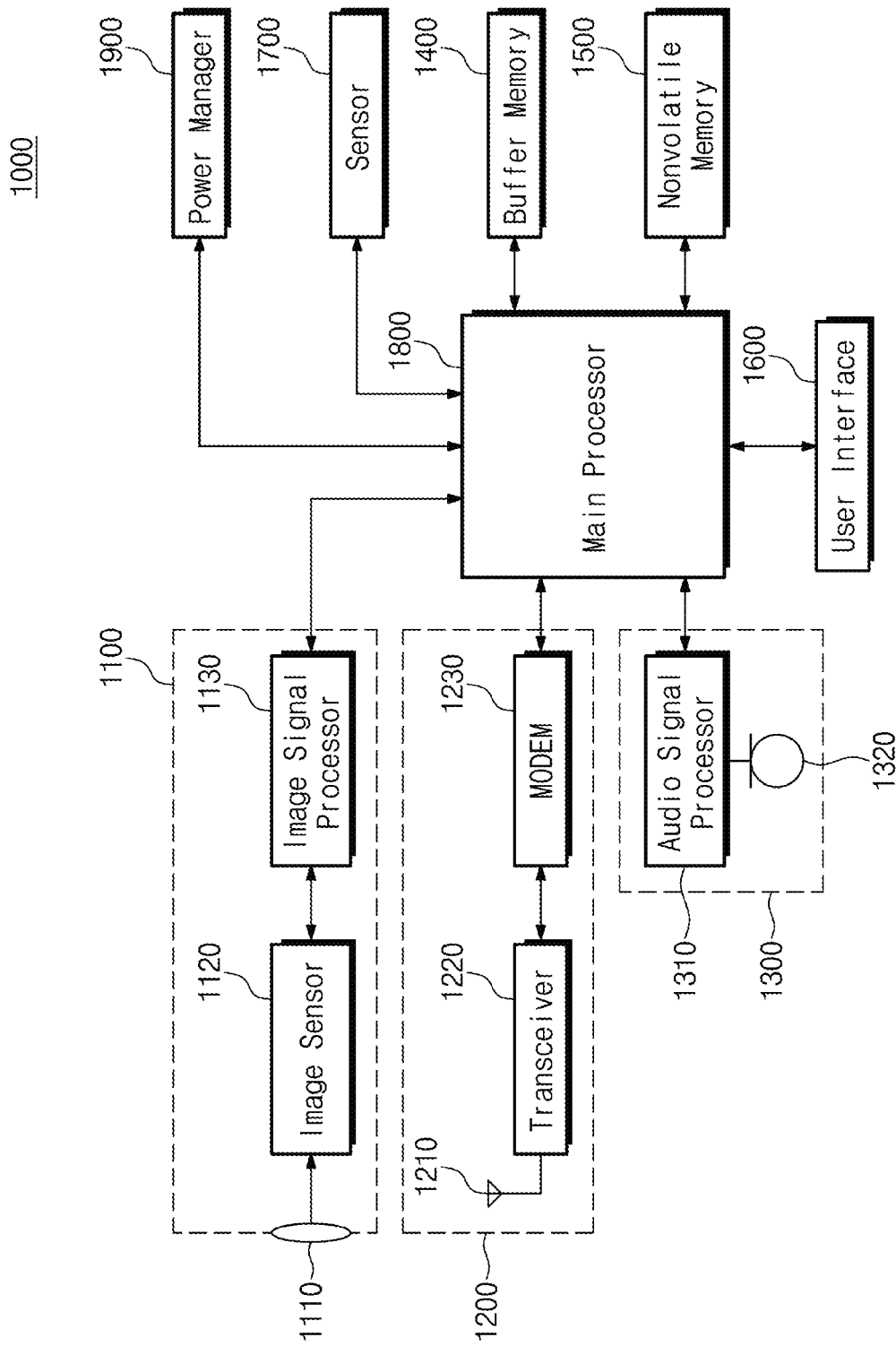
FIG. 17 illustrates an electronic device to which an image sensor of example embodiments is applied.

FIG. 17 illustrates an electronic device 1000 to which an image sensor of example embodiments is applied. However, in some embodiments, an image signal processor 1130 may be provided as a part of the image sensor 1120, may be provided on a circuit or chip independent of an image processing block 1100, and/or may be provided as a part of a main processor 1800.

The image sensor 1120 may photograph an image through a lens 1110, and may perform processing associated with the dual conversion gain described above. The image signal processor 1130 may perform various processing on signals output from the image sensor 1120. For example, the image signal processor 1130 may perform various signal processing such as at least one of bad pixel correction, demosaicing, noise reduction, lens shading correction, gamma correction, edge enhancement, etc. The signals processed by the image signal processor 1130 may be output to the main processor 1800.

A communication block 1200 may exchange signals with an external device/system through an antenna 1210. A transceiver 1220 and a MODEM (Modulator/Demodulator) 1230 of the communication block 1200 may process the exchanged signals in compliance with various communication protocols. For example, the transceiver 1220 and the MODEM 1230 of the communication block 1200 may process signals, which are exchanged with the external device/system, in compliance with a wireless communication protocol such as long term evolution (LTE), worldwide interoperability for microwave access (WiMax), global system for mobile communication (GSM), code division multiple access (CDMA), Bluetooth, near field communication (NFC), wireless fidelity (Wi-Fi), or radio frequency identification (RFID). However, in some embodiments, the communication block 1200 may be provided as a part of the main processor 1800.

An audio processing block 1300 may process sound information by using an audio signal processor 1310. The audio processing block 1300 may receive an audio input through a microphone 1320 or may output an audio through a speaker (not shown).

A buffer memory 1400 may temporarily store data (e.g., data processed or to be processed by the main processor 1800) that are used for an operation of the electronic device 1000. For example, the buffer memory 1400 may include a volatile/nonvolatile memory such as at least one of a static random access memory (SRAM), a dynamic RAM (DRAM), a synchronous DRAM (SDRAM), a phase-change RAM (PRAM), a magneto-resistive RAM (MRAM), a resistive RAM (ReRAM), or a ferro-electric RAM (FRAM). For example, an image photographed by the image processing block 1100 may be stored in the buffer memory 1400. The main processor 1800 may perform HDR processing on the image or images stored in the buffer memory 1400.

A nonvolatile memory 1500 may store data regardless of whether a power is supplied. For example, the nonvolatile memory 1500 may include a nonvolatile memory such as at least one of a flash memory, a PRAM, an MRAM, a ReRAM, or a FRAM. For example, the nonvolatile memory 1500 may include a removable memory such as a hard disk drive (HDD), a solid state drive (SSD), a secure digital (SD) card, universal flash storage (UFS), and/or an embedded memory such as an embedded multimedia card (eMMC).

A user interface 1600 may enable communication between a user and the electronic device 1000. For example, the user interface 1600 may include an input interface such as at least one of a keypad, a button, a touch screen, a touch pad, a vision sensor, a motion sensor, or a gyroscope sensor. For example, the user interface 1600 may further include an output interface such as at least one of an organic LED (OLED) display device, an active matrix OLED (AMO-LED) display device, an LED display device, a liquid crystal display (LCD) device, a motor, or an LED lamp.

A sensor 1700 may sense various types of physical energy provided from the outside of the electronic device 1000. For example, the sensor 1700 may sense a transfer medium of physical energy such as at least one of temperature, a voice, and a light. For example, the sensor 1700 may sense illuminance and may transfer data indicating the sensed illuminance to the main processor 1800.

The main processor 1800 may perform various operations for the purpose of controlling overall operations of the electronic device 1000. The main processor 1800 and all components therein may be implemented with at least one of a general-purpose processor, a special-purpose processor, or an application processor, and may include one or more processor cores. The main processor 1800 may control the image processing block 1100 for the purpose of obtaining image data associated with an object outside the electronic device 1000. For example, the main processor 1800 may generate an HDR image based on an image associated with the low conversion gain and an image associated with the high conversion gain, which are provided from the image processing block 1100.

For example, a power manager 1900 may appropriately convert a power received from a battery or an external power source. The power manager 1900 may supply the converted power to components of the electronic device 1000.

Each of, or at least some of, the components described herein, such as but not limited to the timing controller 180, the ramp generator 140, the switching circuit 130, and the row driver 120, may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments, an HDR image may be implemented by using a dual conversion gain. In particular, because the HDR is implemented in a state where exposure times of respective pixels are identically maintained, the distortion that frequently occurs when exposure times of pixels are different may be prevented, or reduced in likelihood of occurrence.

While some example embodiments has been described with reference to example embodiments thereof, it will be apparent to those of ordinary skill in the art that various changes and modifications may be made thereto without departing from the spirit and scope of example embodiments as set forth in the following claims.

What is claimed is:

1. An image sensor comprising:
    a pixel array including first pixels sharing a first floating diffusion region and second pixels sharing a second floating diffusion region;
    a first analog-to-digital converter configured to process a first pixel signal in a first mode, the first pixel signal output from at least one pixel from among the first pixels through a first column line;
    a second analog-to-digital converter configured to process a second pixel signal in the first mode, the second signal output from at least one pixel from among the second pixels through a second column line; and
    a switch circuit configured to selectively connect the first column line with the second analog-to-digital converter in a second mode, the switch circuit selectively connecting the first column line with the second analog-to-digital converter such that the second analog-to-digital converter processes the first pixel signal,
    wherein, in the second mode, the first analog-to-digital converter is configured to compare a first image component of the first pixel signal with a ramp signal, and to output a first digital value corresponding to the first image component, and
    in the second mode, the second analog-to-digital converter is configured to compare the ramp signal with a second image component of the first pixel signal, and to output a second digital value corresponding to the second image component.

2. The image sensor of claim 1, wherein the second image component corresponds to charges stored in a first capacitor of the first floating diffusion region, and
    the first image component corresponds to charges stored in the first capacitor of the first floating diffusion region and in a second capacitor, the second capacitor being selectively connected with the first floating diffusion region in the second mode.

3. The image sensor of claim 2, wherein the first pixels include a dual conversion transistor configured to electrically disconnect the second capacitor from the first capacitor in the first mode, and to electrically connect the second capacitor with the first capacitor in the second mode.

4. The image sensor of claim 2, wherein a period of comparison between the ramp signal and the second image component is different from a period of comparison between the ramp signal and the first image component.

5. The image sensor of claim 2, wherein the first analog-to-digital converter is configured to be initialized in a first auto-zero period, before the comparison of the ramp signal and the first image component,
    the second analog-to-digital converter is configured to be initialized in a second auto-zero period, before the comparison of the ramp signal and the second image component, and
    the first auto-zero period and the second auto-zero period are different.

6. The image sensor of claim 2, wherein the first pixels include:
    a plurality of photoelectric conversion elements;
    a plurality of transfer transistors including first ends and second ends, the first ends connected with the photoelectric conversion elements and the second ends connected with the first floating diffusion region;
    a reset transistor configured to provide a reset voltage to the first floating diffusion region;
    a drive transistor configured to generate the first pixel signal corresponding to a voltage of the first floating diffusion region;
    a select transistor connected with the drive transistor, and configured to output the first pixel signal to the first column line; and
    a dual conversion transistor configured operate in the second mode to selectively connect the second capacitor with the first floating diffusion region.

7. The image sensor of claim 1, wherein a slope of a first component of the ramp signal to be compared with the first image component is different from a slope of a second component of the ramp signal to be compared with the second image component.

8. The image sensor of claim 1, wherein the first analog-to-digital converter includes,
    a first comparator configured to compare the first image component of the first pixel signal with the ramp signal, and
    a first counter configured to output a first digital value based on a counting clock and on a result of the comparison of the first comparator, the first digital value corresponding to the first image component, and
    wherein the second analog-to-digital converter includes,
    a second comparator configured to compare the ramp signal with the second image component of the first pixel signal, and
    a second counter configured to output a second digital value based on the counting clock and on a result of the comparison of the second comparator, the second digital value corresponding to the second image component.

9. The image sensor of claim 8, wherein each of the first comparator and the second comparator includes:
    an input circuit configured to receive the ramp signal as a first input and the first pixel signal as a second input;
    an output circuit configured to generate an output voltage based on mirroring of a current flowing to the input circuit; and
    an auto-zero switch configured to connect the input circuit and the output circuit.

10. The image sensor of claim 9, wherein a first auto-zero signal controls the auto-zero switch of the first comparator,
    a second auto-zero signal controls the auto-zero switch of the second comparator; and
    an active timing of the first auto-zero signal is different from an active timing of the second auto-zero signal.

11. An image sensor comprising:
a pixel array including first pixels sharing a first floating diffusion region and second pixels sharing a second floating diffusion region;
a first analog-to-digital converter configured to operate in a first mode to process a first pixel signal output from at least one pixel from among the first pixels through a first column line;
a second analog-to-digital converter configured to operate in the first mode to process a second pixel signal output from at least one pixel from among the second pixels through a second column line; and
a switch circuit configured to operate in a second mode to selectively connect the first column line with the second analog-to-digital converter such that the second analog-to-digital converter processes the first pixel signal,
wherein, in the second mode, the first analog-to-digital converter is configured to sample and hold a first image component of the first pixel signal and to compare the held first image component with a ramp signal to output a first digital value corresponding to the first image component, and
in the second mode, the second analog-to-digital converter is configured to sample and hold a second image component of the first pixel signal and to compare the held second image component with the ramp signal to output a second digital value corresponding to the second image component.

12. The image sensor of claim 11, wherein the second image component corresponds to charges stored in a first capacitor of the first floating diffusion region, and
the first image component corresponds to charges stored in the first capacitor of the first floating diffusion region and in a second capacitor selectively connected with the first floating diffusion region.

13. The image sensor of claim 12, wherein the first pixels include:
a plurality of photoelectric conversion elements;
a plurality of transfer transistors including first ends and second ends, the first ends connected with the photoelectric conversion elements and the second ends connected with the first floating diffusion region;
a reset transistor configured to provide a reset voltage to the first floating diffusion region;
a drive transistor configured to generate the first pixel signal corresponding to a voltage of the first floating diffusion region;
a select transistor connected with the drive transistor, and configured to output the first pixel signal to the first column line; and
a dual conversion transistor configured to operate in the second mode to selectively connect the second capacitor with the first floating diffusion region.

14. The image sensor of claim 11, wherein a period of comparison between the ramp signal and the held first image component and a period of comparison between the ramp signal and the held second image component at least partially overlap each other.

15. The image sensor of claim 11, wherein the first analog-to-digital converter is configured to initialize in a first auto-zero period, before the comparison between the ramp signal and the held first image component,
the second analog-to-digital converter is configured to initialize in a second auto-zero period, before the comparison between ramp signal and the held second image component, and
an initialization period of the first analog-to-digital converter and an initialization period of the second analog-to-digital converter at least partially overlap each other.

16. An image sensor comprising:
a pixel array including first pixels sharing a first floating diffusion region and second pixels sharing a second floating diffusion region;
a first analog-to-digital converter configured to operate in a first mode to process a first pixel signal output from at least one pixel from among the first pixels through a first column line; and
a second analog-to-digital converter configured to operate in the first mode to process a second pixel signal output from at least one pixel from among the second pixels through a second column line,
wherein, in a second mode, the first analog-to-digital converter is configured to,
sample and hold a first image component of the first pixel signal, compare the held first image component with a ramp signal, output a first digital value corresponding to the first image component,
sample and hold a second image component of the first pixel signal, compare the held second image component with the ramp signal, and output a second digital value corresponding to the second image component.

17. The image sensor of claim 16, wherein the second image component corresponds to charges stored in a first capacitor of the first floating diffusion region, and
the first image component corresponds to charges stored in the first capacitor of the first floating diffusion region and in a second capacitor selectively connected with the first floating diffusion region.

18. The image sensor of claim 17, wherein the first pixels include:
a plurality of photoelectric conversion elements;
a plurality of transfer transistors including first ends and second ends, the first ends connected with the photoelectric conversion elements and the second ends connected with the first floating diffusion region;
a reset transistor configured to provide a reset voltage to the first floating diffusion region;
a drive transistor configured to generate the first pixel signal corresponding to a voltage of the first floating diffusion region;
a select transistor connected with the drive transistor, and configured to output the first pixel signal to the first column line; and
a dual conversion transistor configured to operate in the second mode to selectively connect the second capacitor with the first floating diffusion region.

19. The image sensor of claim 16, wherein a comparison period between the ramp signal and the held first image component is different from a comparison period between the ramp signal and the held second image component.

20. The image sensor of claim 16, wherein the first analog-to-digital converter is configured to initialize in a first auto-zero period, before the comparison of the ramp signal and the held first image component,
wherein the first analog-to-digital converter is configured to initialize in a second auto-zero period, before the comparison of the ramp signal and the held second image component, and
wherein the first auto-zero period and the second auto-zero period are different.

* * * * *